(12) United States Patent
Muro et al.

(10) Patent No.: US 9,042,005 B2
(45) Date of Patent: May 26, 2015

(54) RAMAN FIBER AMPLIFIER AND ITS CONTROL VIA PATH SWITCHING

(71) Applicant: FUJITSU LIMITED, Kawasaki-shi, Kanagawa (JP)

(72) Inventors: Shinichirou Muro, Mishima (JP); Tomoaki Takeyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 16 days.

(21) Appl. No.: 13/893,461

(22) Filed: May 14, 2013

(65) Prior Publication Data

US 2013/0329278 A1    Dec. 12, 2013

(30) Foreign Application Priority Data

Jun. 7, 2012    (JP) ................. 2012-130226

(51) Int. Cl.
| | | |
|---|---|---|
| H01S 3/30 | (2006.01) | |
| H04B 10/17 | (2006.01) | |
| H01S 3/067 | (2006.01) | |
| H01S 3/13 | (2006.01) | |
| H04B 10/291 | (2013.01) | |
| H04B 10/12 | (2006.01) | |
| H01S 3/094 | (2006.01) | |
| H01S 3/0941 | (2006.01) | |
| H01S 3/10 | (2006.01) | |
| H01S 3/16 | (2006.01) | |

(52) U.S. Cl.
CPC ............. *H01S 3/302* (2013.01); *H01S 3/06758* (2013.01); *H01S 3/094003* (2013.01); *H01S 3/09415* (2013.01); *H01S 3/10015* (2013.01); *H01S 3/1301* (2013.01); *H01S 3/1305* (2013.01); *H01S 3/1608* (2013.01); *H01S 3/1003* (2013.01); *H04B 10/2916* (2013.01)

(58) Field of Classification Search
CPC .. H01S 3/302; H01S 3/06754; H04B 10/2931
USPC .................................................. 359/334, 349
See application file for complete search history.

(56) References Cited

U.S. PATENT DOCUMENTS

| | | | | |
|---|---|---|---|---|
| 6,621,620 | B2 * | 9/2003 | Ohtani ........................... | 359/334 |
| 6,806,998 | B2 * | 10/2004 | Gage et al. ..................... | 359/333 |
| 7,933,063 | B2 * | 4/2011 | Onaka ............................ | 359/334 |
| 2001/0050807 | A1 * | 12/2001 | Deguchi et al. ............ | 359/341.44 |
| 2005/0213196 | A1 * | 9/2005 | Ishikawa et al. ............... | 359/334 |
| 2009/0195863 | A1 | 8/2009 | Onaka et al. | |

FOREIGN PATENT DOCUMENTS

JP    2009-186599    8/2009

* cited by examiner

*Primary Examiner* — Eric Bolda
(74) *Attorney, Agent, or Firm* — Staas & Halsey LLP

(57) ABSTRACT

An amplifying-apparatus that raman-amplifies light transmitted through an optical-fiber-transmission-path, includes: an inputting-unit that inputs pump light to the optical-fiber-transmission-path; a path-switching-unit that is capable of switching between a first state in which the light transmitted through the optical-fiber-transmission-path is output to a first path and a second state in which the light transmitted through the optical-fiber-transmission-path is output to a second path; a splitting-unit that splits the light output to the second path by the path-switching-unit and outputs resulting first light and second light; and a control-circuit that stores information based on a result of reception of the light output to the first path by putting the path-switching-unit into the first state and then controls power of the pump light on a basis of the stored information and a result of reception of the first light output by the splitting-unit by putting the path-switching-unit into the second state.

12 Claims, 20 Drawing Sheets

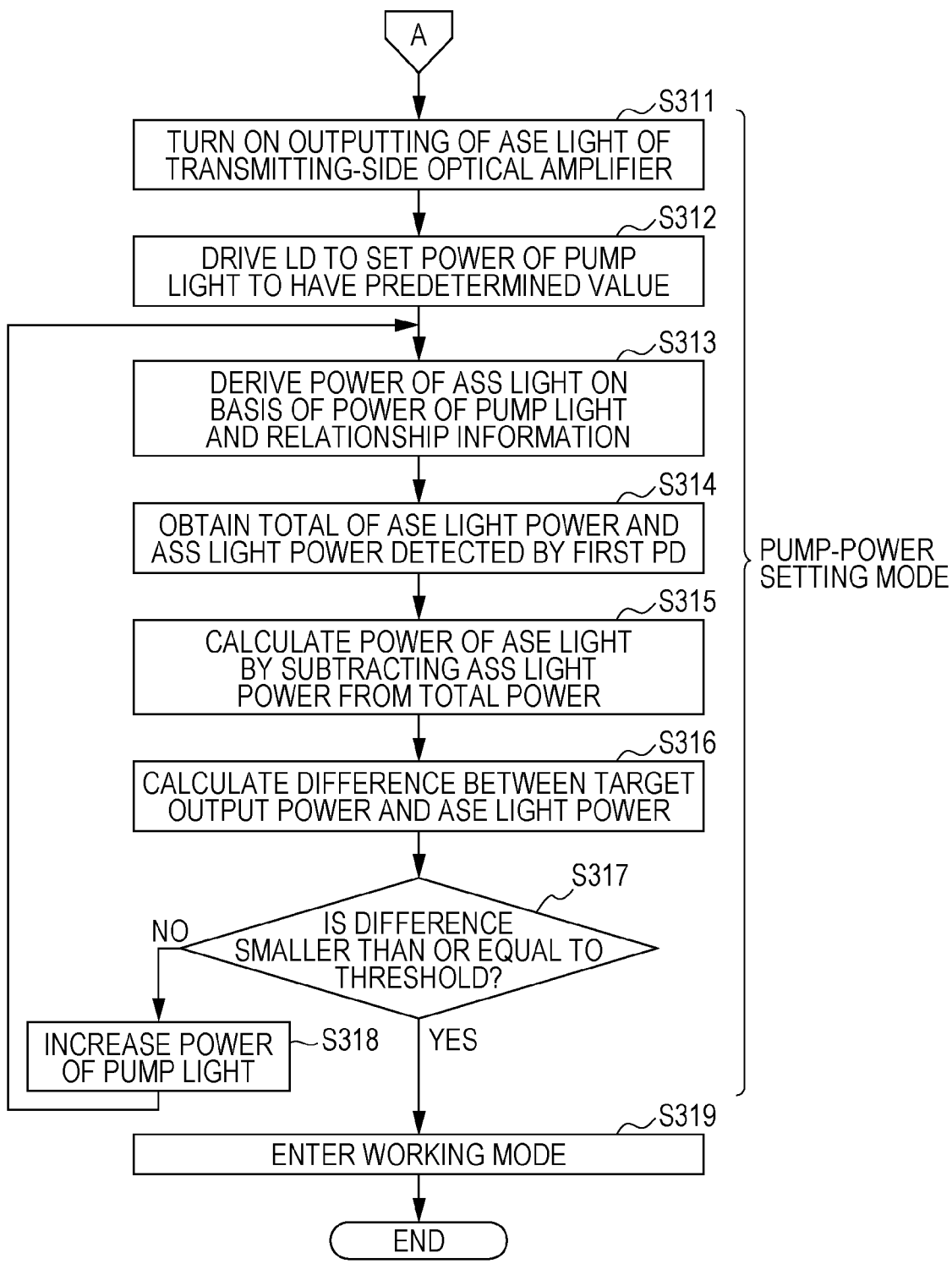

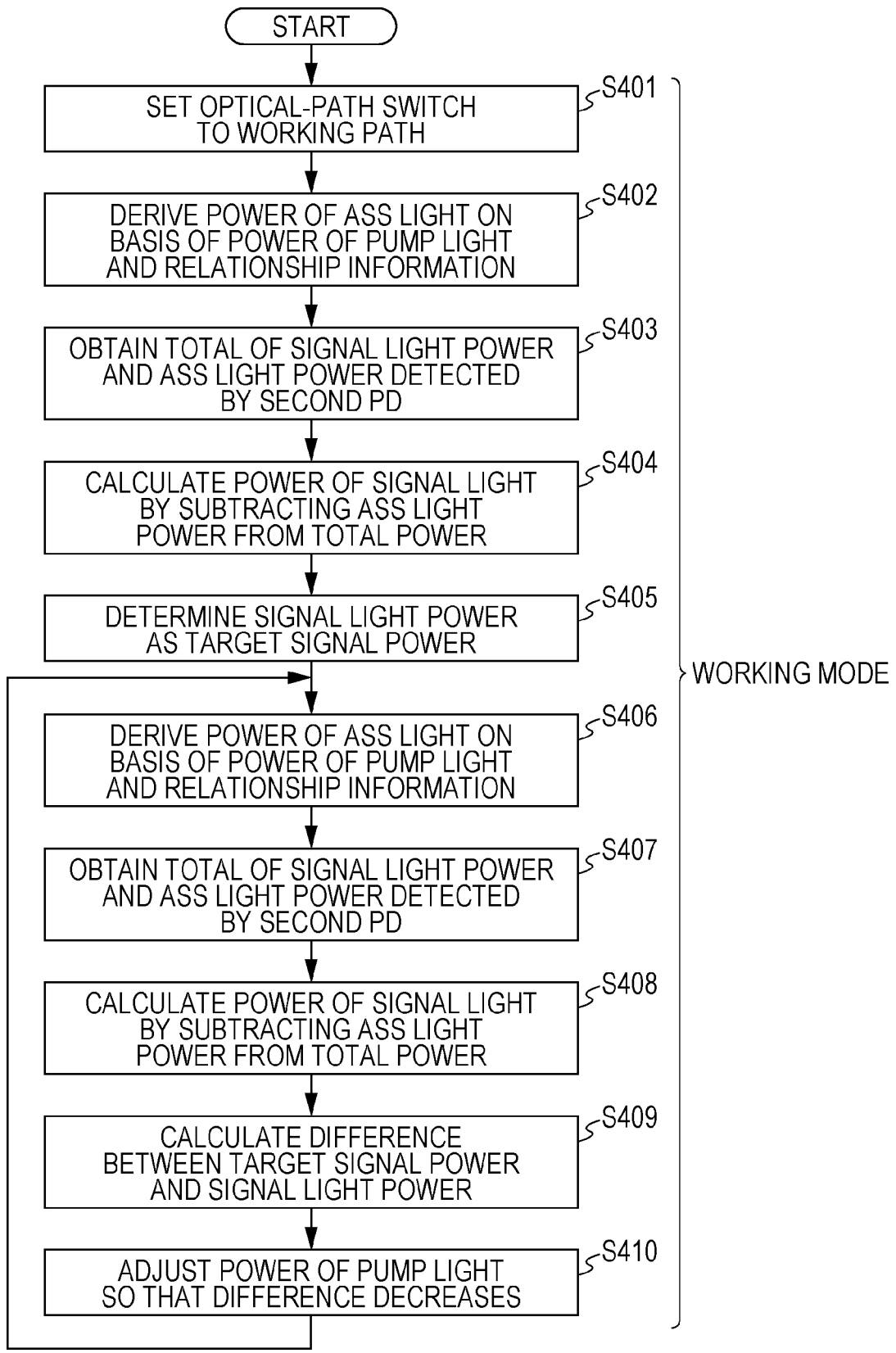

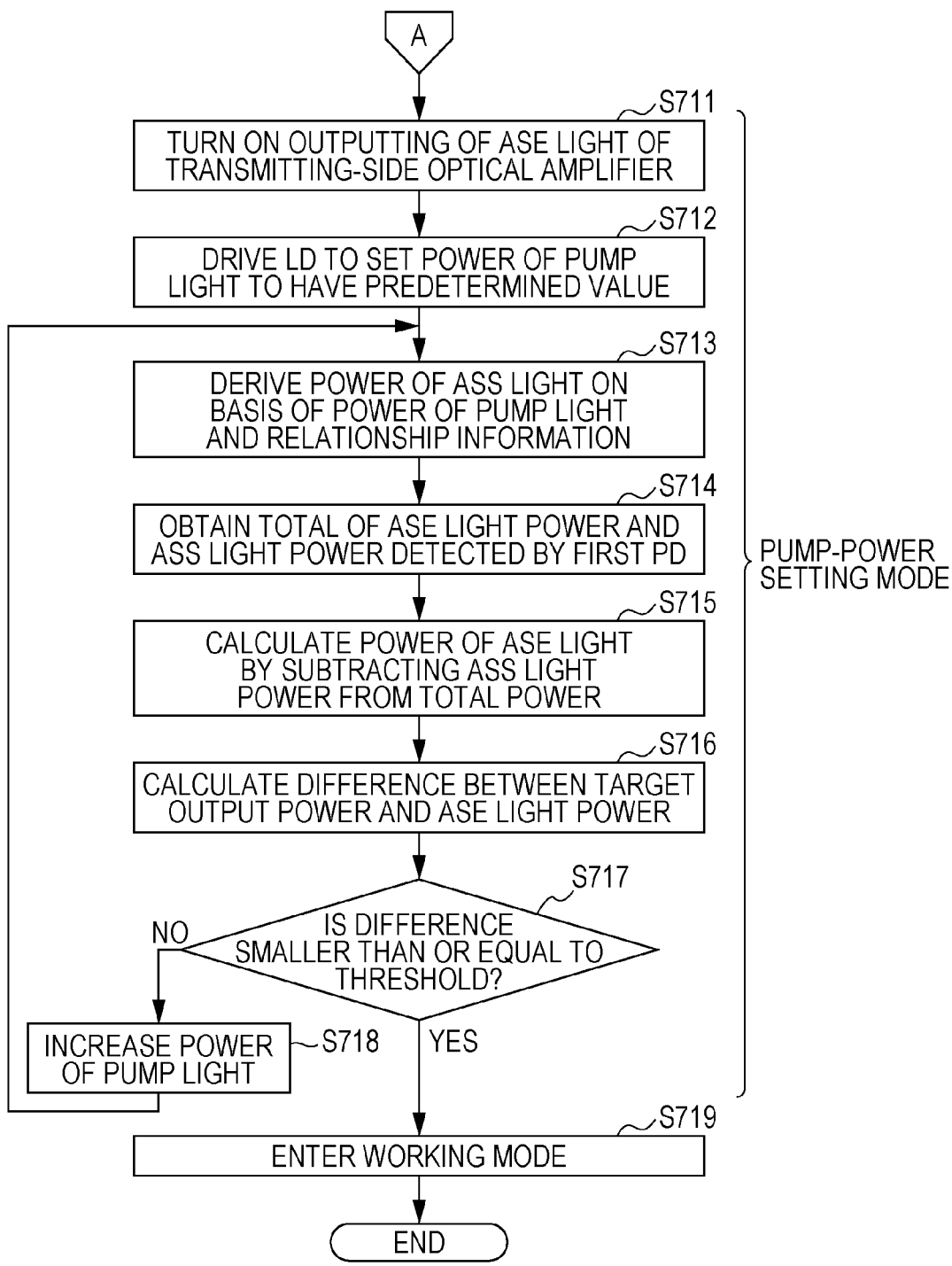

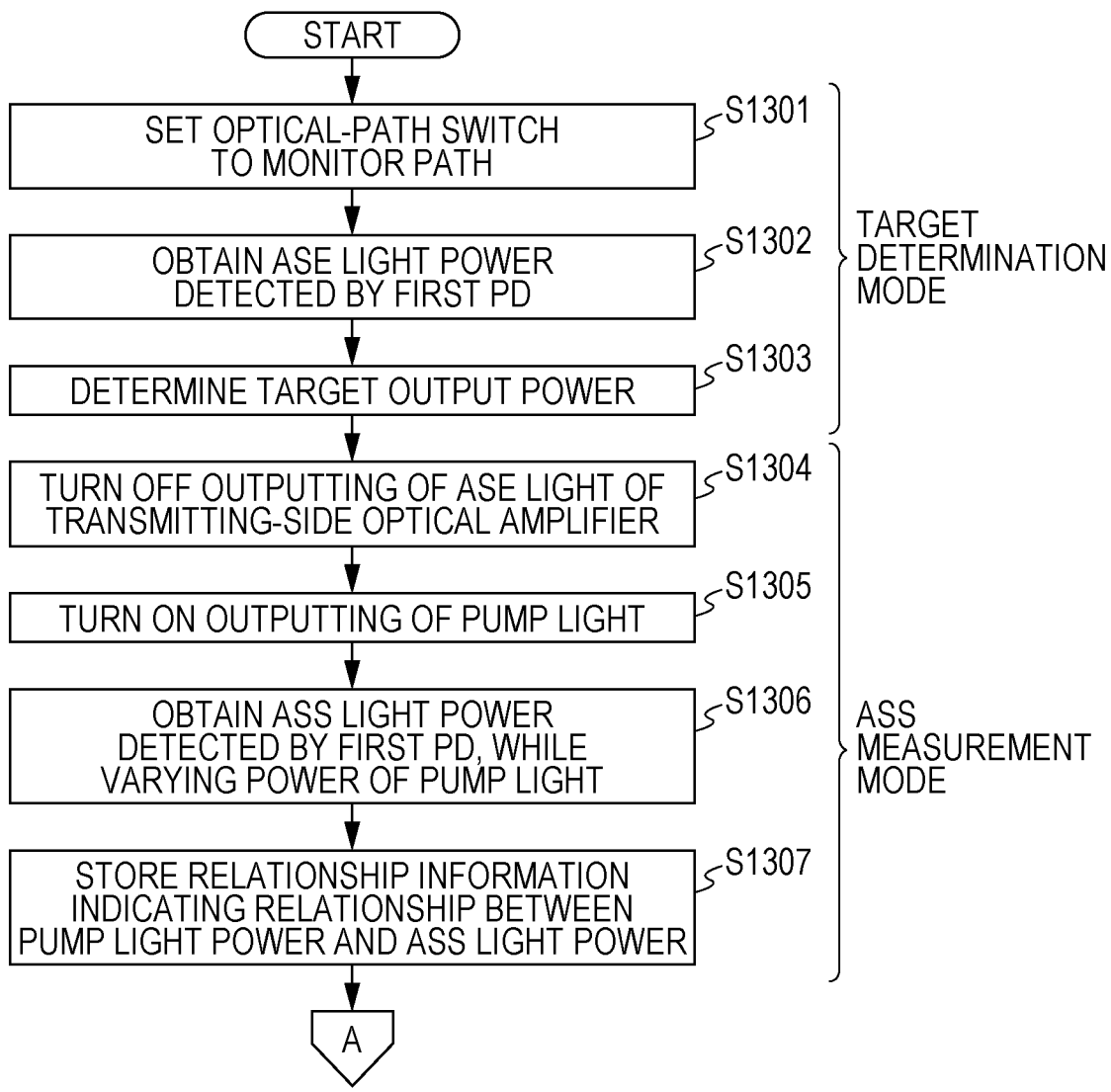

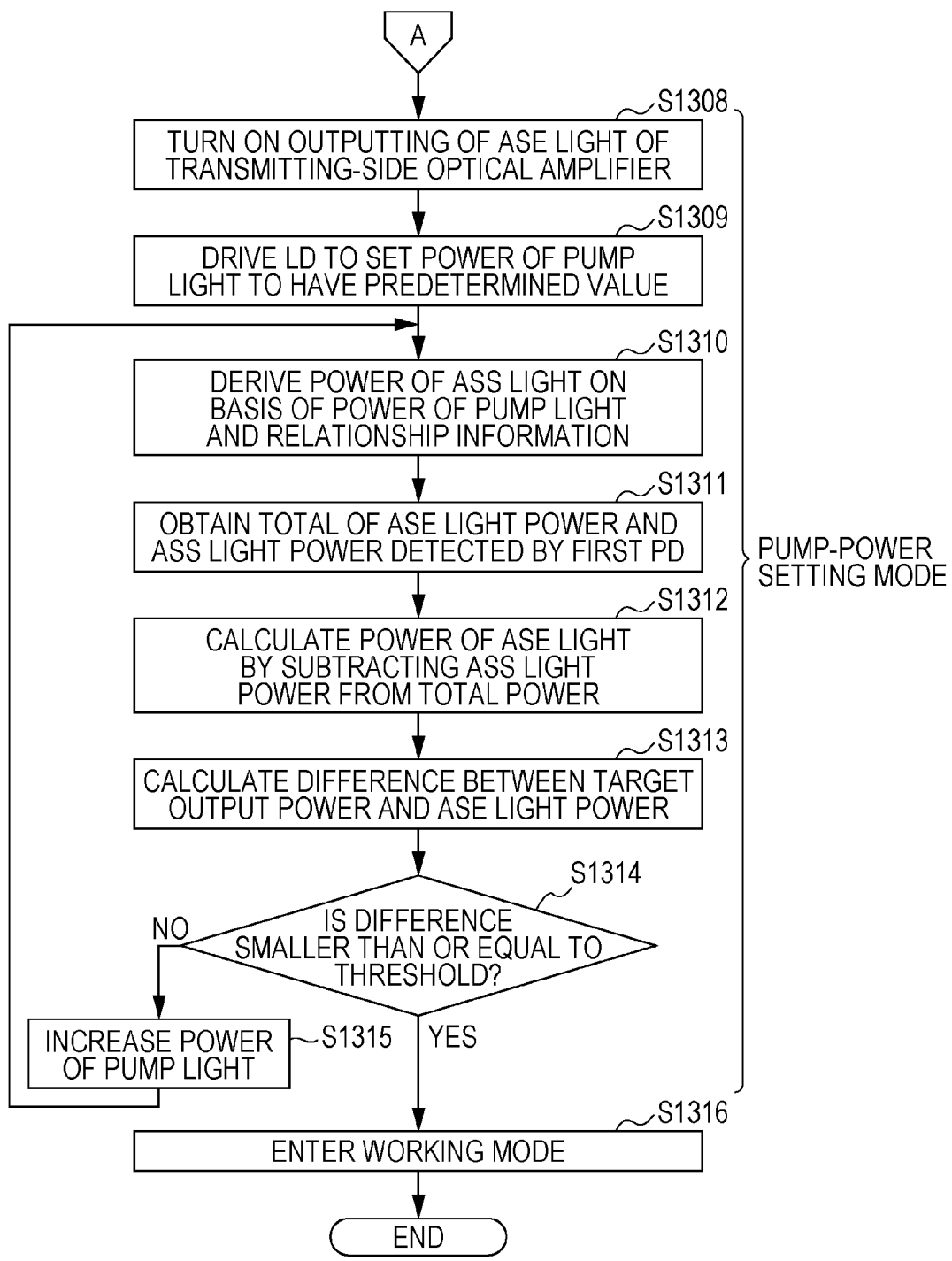

RAMAN FIBER AMPLIFIER AND ITS CONTROL VIA PATH SWITCHING

CROSS-REFERENCE TO RELATED APPLICATION

This application is based upon and claims the benefit of priority of the prior Japanese Patent Application No. 2012-130226 filed on Jun. 7, 2012, the entire contents of which are incorporated herein by reference.

FIELD

The embodiments discussed herein are related to an amplifying apparatus and a control method.

BACKGROUND

Hitherto, erbium-doped fiber amplifiers (EDFAs) and Raman amplifiers have been available as optical amplifiers.

Raman amplifiers are utilized, for example, when an optical-fiber transmission path has a large length and a large amount of relay loss is likely. For example, a Raman amplifier that splits received light, monitors the power of the split received light, and controls the power of pump light on the basis of a result of the monitoring has been disclosed (for example, see Japanese Laid-open Patent Publication No. 2009-186599).

However, in the related art described above, since the power of light resulting from the splitting of the received light decreases, there are problems in that the power of the received light is not monitored with high accuracy and the amount of error in the Raman gain increases.

SUMMARY

According to an aspect of the invention, An amplifying-apparatus that raman-amplifies light transmitted through an optical-fiber-transmission-path, includes: an inputting-unit that inputs pump light to the optical-fiber-transmission-path; a path-switching-unit that is capable of switching between a first state in which the light transmitted through the optical-fiber-transmission-path is output to a first path and a second state in which the light transmitted through the optical-fiber-transmission-path is output to a second path; a splitting-unit that splits the light output to the second path by the path-switching-unit and outputs resulting first light and second light; and a control-circuit that stores information based on a result of reception of the light output to the first path by putting the path-switching-unit into the first state and then controls power of the pump light on a basis of the stored information and a result of reception of the first light output by the splitting-unit by putting the path-switching-unit into the second state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3B is a flowchart (part 2) illustrating one example of operations of a control circuit in the second embodiment during startup;

FIG. 4 is a flowchart illustrating one example of operations of the control circuit in the second embodiment in a working mode;

FIG. 7B is flowchart (part 2) illustrating one example of the operations of the control circuit in the fourth embodiment during startup;

FIG. 13A is a flowchart (part 1) illustrating one example of operations of a control circuit in the eighth embodiment during startup; and FIG. 13B is a flowchart (part 2) illustrating one example of the operations of the control circuit in the eighth embodiment during startup.

DESCRIPTION OF EMBODIMENTS

An amplifying apparatus and a control method according to embodiments of the present disclosure will be described below in detail with reference to the accompanying drawings.

First Embodiment

Figure 1A:
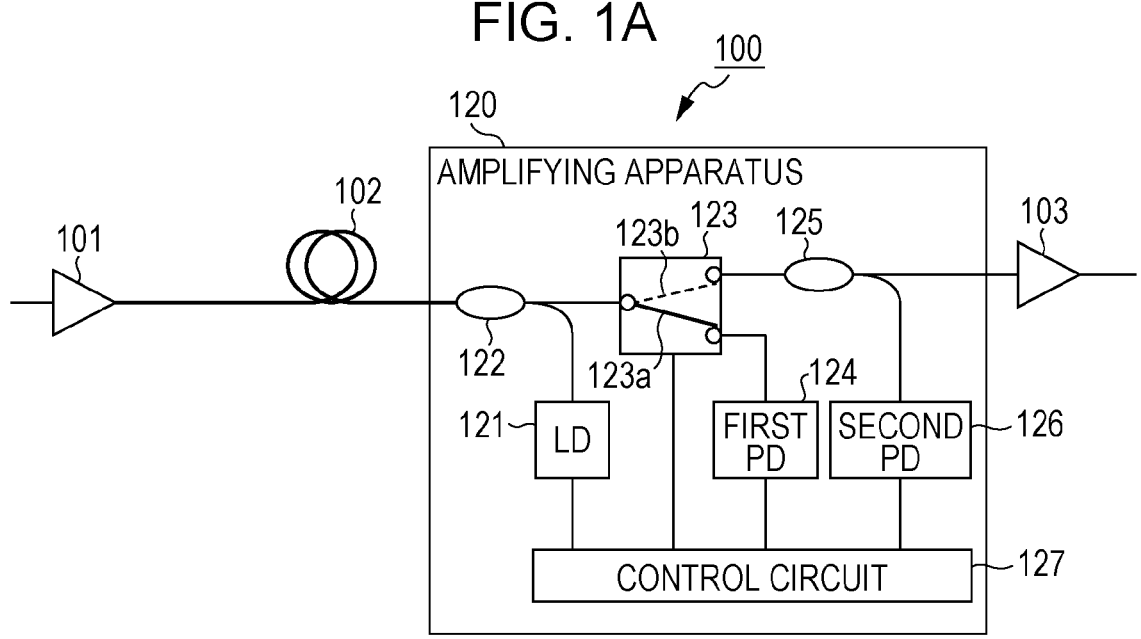
FIG. 1A is a diagram illustrating one example of the configuration of a transmission system according to a first embodiment.
Figure 1B:
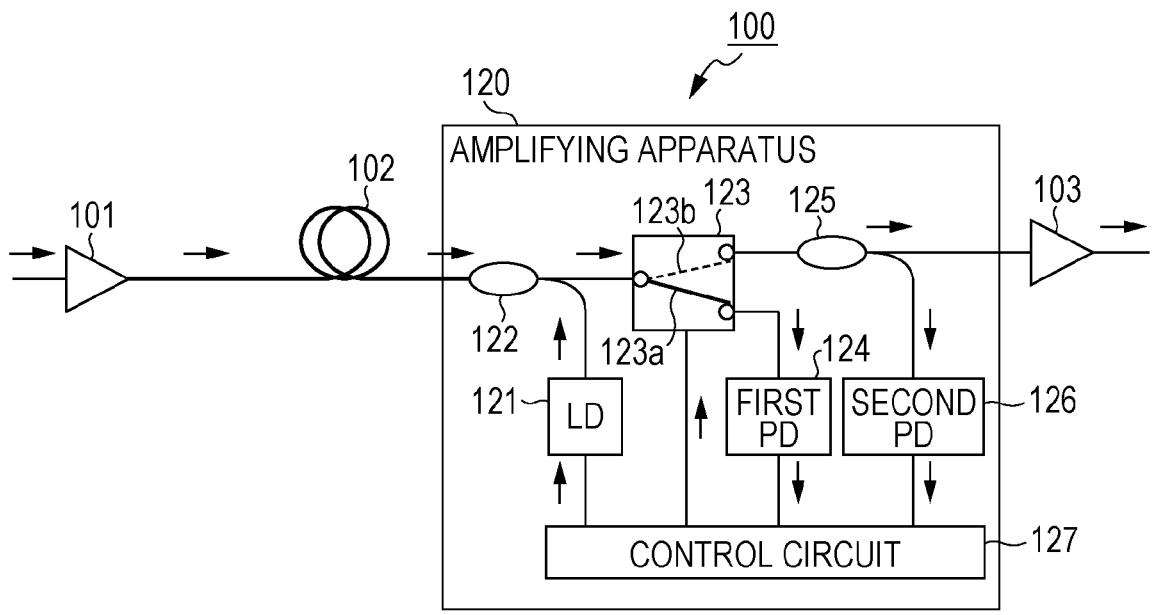
FIG. 1B is a diagram illustrating one example of flows of light and electrical signals in the transmission system illustrated in FIG. 1A.

FIG. 1A is a diagram illustrating one example of the configuration of a transmission system according to a first embodiment. FIG. 1B is a diagram illustrating one example of flows of light and electrical signals in the transmission system illustrated in FIG. 1A.

As illustrated in FIGS. 1A and 1B, a transmission system 100 according to the first embodiment includes a transmitting-side optical amplifier 101, an optical-fiber transmission path 102, an amplifying apparatus 120, and a receiving-side optical amplifier 103.

The transmitting-side optical amplifier 101 is provided at a signal light transmitting side of the transmission system 100. The transmitting-side optical amplifier 101 is, for example, an erbium-doped fiber amplifier (EDFA). The transmitting-side optical amplifier 101 amplifies input light and outputs the resulting light to the optical-fiber transmission path 102. The transmitting-side optical amplifier 101 also outputs amplified spontaneous emission (ASE) light in a wavelength band including the wavelength of signal light transmitted through the optical-fiber transmission path 102.

The optical-fiber transmission path 102 serves as a path through which the light output from the transmitting-side optical amplifier 101 is transmitted and output to the amplifying apparatus 120. The optical-fiber transmission path 102 also serves as a path through which pump light output from the amplifying apparatus 120 is transmitted and output to the transmitting-side optical amplifier 101 in a direction opposite to the direction in which the light output from the transmitting-side optical amplifier 101 is transmitted. The optical-fiber transmission path 102 may be realized by, for example, an optical fiber line of a few tens of kilometers to a hundred and several tens of kilometers.

The amplifying apparatus 120 inputs pump light to the optical-fiber transmission path 102. Thus, the signal light output from the transmitting-side optical amplifier 101 and transmitted through the optical-fiber transmission path 102 is Raman-amplified by stimulated Raman scattering (SRS). The amplifying apparatus 120 outputs the light, Raman-amplified and output from the optical-fiber transmission path 102, to the receiving-side optical amplifier 103. The receiving-side optical amplifier 103 is provided at a signal-light receiving side of the transmission system 100.

More specifically, the amplifying apparatus 120 includes a laser diode (LD) 121, a wavelength-division multiplexing (WDM) coupler 122, an optical-path switch 123, a first photodetector (PD) 124, an optical splitter 125, a second PD 126, and a control circuit 127.

The LD 121 is driven by a drive signal output from the control circuit 127 and outputs the pump light to the WDM coupler 122. The power of the pump light output from the LD 121 is controlled by the control circuit 127. The wavelength of the pump light output from the LD 121 may be, for example, a wavelength that is shorter than the wavelength of the signal light, transmitted through the optical-fiber transmission path 102, by about 13 THz.

The WDM coupler 122 outputs the light, output from the optical-fiber transmission path 102, to the optical-path switch 123. The WDM coupler 122 also outputs the pump light, output from the LD 121, to the optical-fiber transmission path 102. The WDM coupler 122 realizes an inputting unit that inputs pump light to the optical-fiber transmission path 102.

The optical-path switch 123 is capable of switching between a monitor path 123a through which the light output from the WDM coupler 122 is output to the first PD 124 and a working path 123b through which the light output from the WDM coupler 122 is output to the optical splitter 125. The path switching of the optical-path switch 123 is controlled according to a switching signal output from the control circuit 127.

The optical-path switch 123 may be realized by, for example, a, micro electro mechanical system (MEMS). The optical-path switch 123 realizes a first path switching unit that is capable of switching between a first state in which the light transmitted through the optical-fiber transmission path 102 is output to a first path and a second state in which the light transmitted through the optical-fiber transmission path 102 is output to a second path.

The first PD 124 receives the light output from the optical-path switch 123 to detect the power of the received light. The first PD 124 then outputs information indicating the detected power to the control circuit 127.

The optical splitter 125 splits the light output from the optical-path switch 123 and outputs resulting first light and second light to the second PD 126 and the receiving-side optical amplifier 103, respectively. The second PD 126 receives the first light output from the optical splitter 125 to detect the power of the received light. The second PD 126 then outputs information indicating the detected power to the control circuit 127. The optical splitter 125 realizes a splitting unit that splits light output to the second path by the optical-path switch 123 and outputs first and second light.

The splitting ratio of the optical splitter 125 is set so that, for example, the power of the light output to the receiving-side optical amplifier 103 is larger than the power of the light output to the second PD 126. This arrangement makes it possible to suppress a reduction in the power of the signal light transmitted to the receiving-side optical amplifier 103. For example, the splitting ratio of the optical splitter 125 is set so that the ratio of the strength of the light output to the receiving-side optical amplifier 103 to the strength of the light output to the second PD 126 is about 20 to 1.

The control circuit 127 may be realized by, for example, an arithmetic operation circuit, such as a field-programmable gate array (FPGA). The control circuit 127 stores information based on a result of the reception of the light output to the first PD 124 (that is, the first path) by setting the optical-path switch 123 to the monitor path 123a (that is, the first state). Thereafter, on the basis of the stored information and a result of the reception of first light of first and second light output by the optical splitter 125 by setting the optical-path switch 123 to the working path 123b (that is, the second state), the control circuit 127 controls the power of pump light.

More specifically, the control circuit 127 outputs the drive signal to the LD 121 to control ON/OFF of outputting of the pump light from the LD 121 and the power of the pump light output from the LD 121. The control circuit 127 also outputs the switching signal to the optical-path switch 123 to control the path switching of the optical-path switch 123. More specifically, in the first state (for example, during startup), the control circuit 127 sets the optical-path switch 123 to the monitor path 123a and controls the power of the pump light of the LD 121 on the basis of the power indicated by the information output from the first PD 124. With this arrangement, the first PD 124 can receive light in the amplifying apparatus 120 with low loss and can detect the power of the received light with high accuracy, so that the power of the pump light can be controlled based on the power detected with high accuracy.

In the second state (for example, in a working time), the control circuit 127 sets the optical-path switch 123 to the working path 123b and controls the power of the pump light of the LD 121 on the basis of the power indicated by the information output from the second PD 126. With this arrangement, it is possible to detect the power of received light in the amplifying apparatus 120 while outputting the received light to the receiving-side optical amplifier 103. In addition, the power of pump light can be controlled based on the detected power.

As described above, the amplifying apparatus 120 according to the first embodiment has the optical-path switch 123 that is capable of switching the output path of received light between the working path 123b and the monitor path 123a. Thus, in a non-working time, the received light can be monitored with low loss through use of the monitor path 123a. With this arrangement, in a working time, signal light is transmitted to a subsequent stage through the working path 123b and, in a non-working time, the power of pump light can be controlled based on a result of the low-loss monitoring of the received light. Thus, it is possible to reduce the amount of error in the Raman gain.

In addition, the amplifying apparatus 120 according to the first embodiment has the WDM coupler 122 between the optical-fiber transmission path 102 and the optical-path switch 123, as described above. This arrangement allows the pump light to be input to the optical-fiber transmission path 102 in a direction opposite to the direction in which light is transmitted through the optical-fiber transmission path 102. With this arrangement, Raman amplification can be performed using backward pumping and the pump light can be input to the optical-fiber transmission path 102, regardless of the state of the optical-path switch 123.

For example, during startup of the amplifying apparatus 120, ASE light, which is EDFA noise light, is input from the transmitting-side optical amplifier 101 to the optical-fiber transmission path 102. The ASE light is light in a wide band including a signal-light band and has a power of, for example, about 0 dBm.

For example, when an optical fiber of 200 km is used for the optical-fiber transmission path 102 and a loss of about 0.2 dB/km occurs through the optical-fiber transmission path 102, the span loss of the optical-fiber transmission path 102 is about 40 dB. In this case, ASE light input from the transmitting-side optical amplifier 101 to the optical-fiber transmission path 102 can have a power of −40 dBm or lower until the ASE light arrives at the amplifying apparatus 120.

If the second PD 126 receives ASE light that arrives at the amplifying apparatus 120 without provision of the optical-path switch 123 in the amplifying apparatus 120, the power of the ASE light received by the second PD 126 is further reduced by the optical splitting performed by the optical splitter 125. For example, when the optical splitter 125 splits the light at an intensity ratio of 20 to 1 and outputs resulting second light and first light to the receiving-side optical amplifier 103 and the second PD 126 at an intensity ratio of 20 to 1, the power of the ASE light received by the second PD 126 is about −53 dBm or lower.

For example, when the light-receiving sensitivity of the second PD 126 is 1000 mA/W and a dark current is 1 nA, this dark current is converted into a light-receiving power of −60 dBm. Thus, when the power of the ASE light is assumed to be −53 dBm as described above, a monitor error of as high as 0.8 dB occurs.

In contrast, in the amplifying apparatus 120, during startup, the optical-path switch 123 is set to the monitor path 123a, so that the ASE light can be received by the first PD 124 without the ASE light being split. Accordingly, for example, the power of the ASE light received by the first PD 124 can be set to about −40 dBm.

Thus, the monitor error can be reduced to 0.1 dB or lower. That is, compared with a configuration in which the optical-path switch 123 is not provided, the amplifying apparatus 120 can reduce the amount of monitor error even when the span loss of the optical-fiber transmission path 102 is the same. Accordingly, it is possible to improve the accuracy of Raman gain control through adjustment of the power of the pump light. When the transmission distance is limited by a detection error of the span loss, a reduction in the monitor error makes it possible to increase the distance of the transmission path.

In addition, with a reduction in the monitor loss, the power of amplified stimulated Raman scattering (ASS) light, which is noise light produced during Raman amplification, can be monitored with high accuracy. Thus, for example, even for a system in which the Raman gain is small and the power of ASS light is small, it is possible to improve the accuracy of Raman gain control through pump light power adjustment based on the power of the ASS light.

Second Embodiment

Figure 2A:
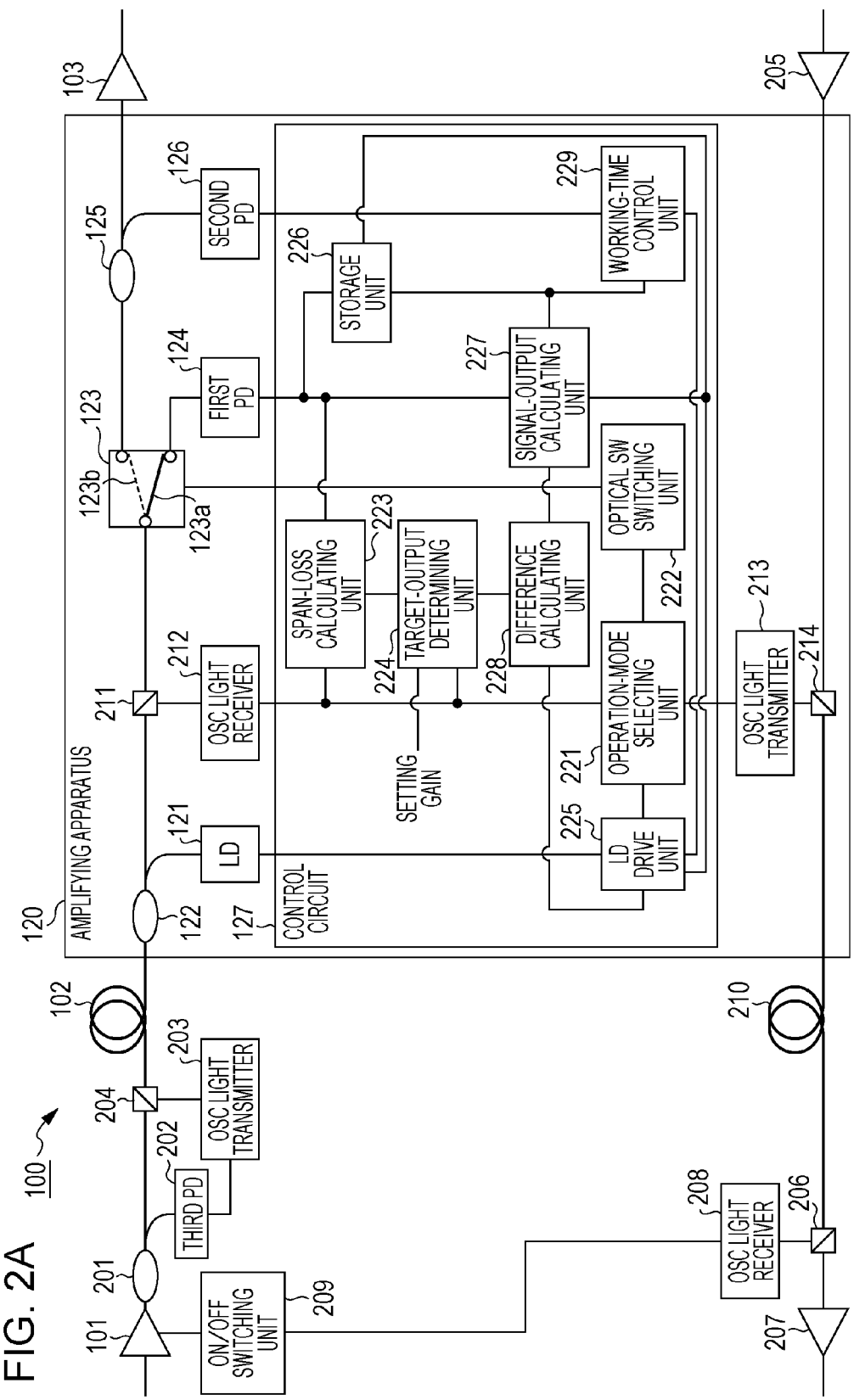
FIG. 2A is a diagram illustrating one example of the configuration of a transmission system according to a second embodiment.
Figure 2B:
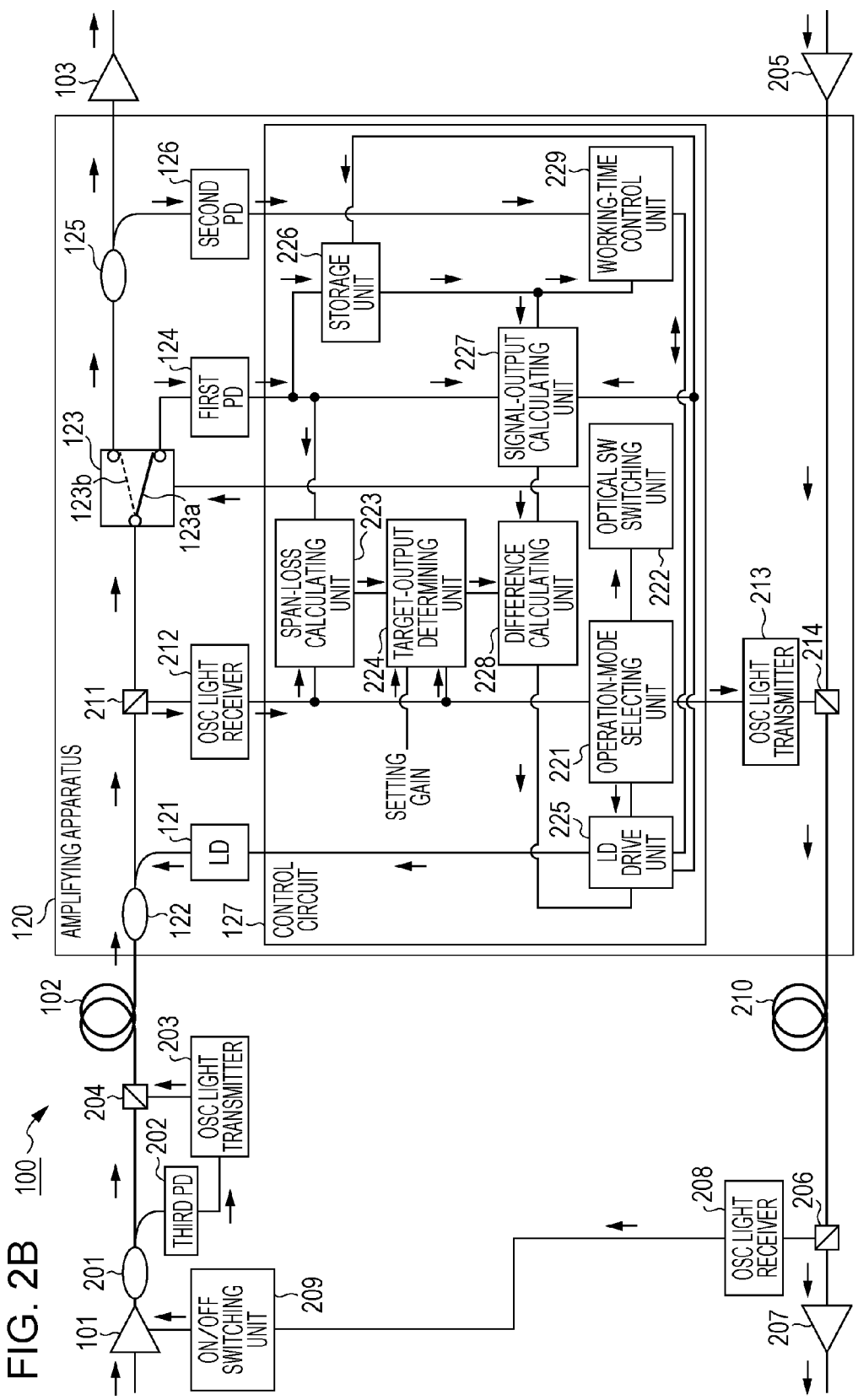
FIG. 2B is a diagram illustrating one example of a flow of light and electrical signals in the transmission system illustrated in FIG. 2A.

FIG. 2A is a diagram illustrating one example of the configuration of a transmission system according to a second embodiment. FIG. 2B is a diagram illustrating one example of a flow of light and electrical signals in the transmission system illustrated in FIG. 2A. In FIGS. 2A and 2B, elements that are substantially the same as those illustrated in FIGS. 1A and 1B are denoted by the same reference numerals and descriptions thereof are not given hereinafter.

As illustrated in FIGS. 2A and 2B, a transmission system 100 according to the second embodiment includes an optical splitter 201, a third PD 202, an OSC light transmitter 203, and an OSC coupler 204, in addition to the configuration illustrated in FIGS. 1A and 1B. The transmission system 100 further includes a transmitting-side optical amplifier 205, an OSC coupler 206, a receiving-side optical amplifier 207, an OSC light receiver 208, an on/off switching unit 209, and an optical-fiber transmission path 210.

The transmitting-side optical amplifier 101 amplifies light and outputs the amplified light to the optical splitter 201. The optical splitter 201 splits the light output from the transmitting-side optical amplifier 101 and outputs resulting first light and second light to the third PD 202 and the OSC coupler 204, respectively. The third PD 202 receives the first light output from the optical splitter 201 to detect the power of the received light. The third PD 202 outputs information indicating the detected power to the OSC light transmitter 203.

The OSC light transmitter 203 generates optical supervisor channel (OSC) light including the information output from the third PD 202 and outputs the generated OSC light to the OSC coupler 204. The OSC light has a different wavelength from the wavelength of signal light transmitted through an optical-fiber transmission path 102. The OSC coupler 204 wavelength-multiplexes the light output from the optical splitter 201 and the OSC light output from the OSC light transmitter 203 and sends out the wavelength-multiplexed light to the optical-fiber transmission path 102.

The amplifying apparatus 120 includes an OSC coupler 211, an OSC light receiver 212, an OSC light transmitter 213, and an OSC coupler 214, in addition to the configuration illustrated in FIGS. 1A and 1B. The OSC light transmitter 213 and the OSC coupler 214 may also be provided exterior to the amplifying apparatus 120.

A WDM coupler 122 outputs the light, output from the optical-fiber transmission path 102, to the OSC coupler 211. The OSC coupler 211 wavelength-divides the OSC light included in the light output from the WDM coupler 122 and outputs the resulting light to the OSC light receiver 212. The OSC coupler 211 also outputs light, other than the OSC light, of the light output from the WDM coupler 122 to an optical-path switch 123. The OSC light receiver 212 receives the OSC light output from the OSC coupler 211. The OSC light receiver 212 outputs a result of the reception of the OSC light to a control circuit 127.

The control circuit 127 includes an operation-mode selecting unit 221, an optical switch (SW) switching unit 222, a span-loss calculating unit 223, a target-output determining unit 224, an LD drive unit 225, a storage unit 226, a signal-output calculating unit 227, a difference calculating unit 228, and a working-time control unit 229.

The operation-mode selecting unit 221 selects an operation mode of the control circuit 127 and controls the optical switch switching unit 222, the LD drive unit 225, and the OSC light transmitter 213 in accordance with the selected operation mode. In accordance with the selected operation mode, the operation-mode selecting unit 221 outputs a control signal for the on/off switching unit 209 to the OSC light transmitter 213 to thereby control ON/OFF of outputting of the ASE light from the transmitting-side optical amplifier 101.

Under the control of the operation-mode selecting unit 221, the optical switch switching unit 222 switches a path in the optical-path switch 123.

The span-loss calculating unit 223 obtains a span loss of the optical-fiber transmission path 102. More specifically, the span-loss calculating unit 223 obtains the transmitting-side ASE light power, detected by the third PD 202, from the control signal included in the reception result output from the OSC light receiver 212. The span-loss calculating unit 223 also obtains ASE light power detected by a first PD 124. The span-loss calculating unit 223 then calculates the difference between the powers of the obtained ASE light to thereby calculate the span loss of the optical-fiber transmission path 102. The span-loss calculating unit 223 outputs information indicating the calculated span loss to the target-output determining unit 224.

The target-output determining unit 224 determines a target output power of the amplifying apparatus 120. More specifically, the target-output determining unit 224 obtains the ASE light power, detected by the third PD 202, from the control signal included in the reception result output from the OSC light receiver 212. The target-output determining unit 224 also obtains the span loss indicated by the information output from the span-loss calculating unit 223. In addition, the target-output determining unit 224 obtains a predetermined setting gain. The setting gain is pre-stored in, for example, a memory in the amplifying apparatus 120. The target-output determining unit 224 determines, as a target output power, a result obtained by subtracting the obtained span loss from the obtained ASE light power and adding the obtained predetermined setting gain to the result of the subtraction. The target-output determining unit 224 outputs information indicating the determined target output power to the difference calculating unit 228.

Under the control of the operation-mode selecting unit 221, the LD drive unit 225 outputs a drive signal to the LD 121 to drive the LD 121 and also adjust the power of the pump light of the LD 121. The LD drive unit 225 also outputs information indicating the present power of the pump light of the LD 121 to the signal-output calculating unit 227 and the working-time control unit 229. The LD drive unit 225 also adjusts the power of the pump light so that, in a pump-power setting mode described below, a difference indicated by information output from the difference calculating unit 228 is smaller than or equal to a threshold.

In an ASS measurement mode described below, the storage unit 226 stores therein relationship information indicating a relationship between the pump light power indicated by the information output from the LD drive unit 225 and ASS light power detected by the first PD 124. The relationship information may be represented by a table indicating a relationship between the power of pump light and the power of ASS light and also may be represented by a function with which the power of ASS light can be derived from the power of pump light.

The aforementioned pump-power setting mode is a mode in which the power of pump light is set, and in the pump-power setting mode, the signal-output calculating unit 227 derives the power of ASS light on the basis of the pump light power indicated by the information output from the LD drive unit 225 and the relationship information stored in the storage unit 226. The signal-output calculating unit 227 then calculates the power of the ASE light by subtracting the derived ASS light power from a total of the ASE light power and ASS light power detected by the first PD 124. The signal-output calculating unit 227 outputs information indicating the calculated ASE light power to the difference calculating unit 228.

In the pump-power setting mode, the difference calculating unit 228 calculates a difference between the target output power indicated by the information output from the target-output determining unit 224 and the ASE light power indicated by the information output from the signal-output calculating unit 227. The difference calculating unit 228 outputs information indicating the calculated difference to the LD drive unit 225.

While Raman-amplifying the signal light and outputting the resulting signal light to the receiving-side optical amplifier 103, the working-time control unit 229 controls the power of the pump light of the LD 121 in a working mode in which the power of the pump light is controlled. More specifically, the working-time control unit 229 derives the power of the ASS light on the basis of the pump light power indicated by the information output from the LD drive unit 225 and the relationship information stored in the storage unit 226. The working-time control unit 229 then calculates the power of the signal light by subtracting the derived ASS light power from the total of the signal light power and the ASS light power detected by the second PD 126. The working-time control unit 229 then controls the power of the pump light via the LD drive unit 225 so that the signal light power to be calculated is maintained.

The OSC light transmitter 213 generates OSC light including a control signal output from the control circuit 127 and outputs the generated OSC light to the OSC coupler 214. The transmitting-side optical amplifier 205 is provided at a transmitting side in transmission of signal light through the optical-fiber transmission path 210. The transmitting-side optical amplifier 205 amplifies input light and outputs the resulting light to the OSC coupler 214.

The OSC coupler 214 wavelength-multiplexes the light output from the transmitting-side optical amplifier 205 and the OSC light output from the OSC light transmitter 213 and sends out the wavelength-multiplexed light to the optical-fiber transmission path 210. The light output from the OSC coupler 214 is transmitted through the optical-fiber transmission path 210 and is output to the OSC coupler 206.

The OSC coupler 206 wavelength-divides the OSC light included in the light output from the optical-fiber transmission path 210 and outputs the resulting light to the OSC light receiver 208. The OSC coupler 206 also outputs light, other than OSC light, of the light output from the optical-fiber transmission path 210 to the receiving-side optical amplifier 207.

The receiving-side optical amplifier 207 is provided at a receiving side in transmission of the signal light through the optical-fiber transmission path 210. The receiving-side optical amplifier 207 amplifies the light output from the OSC coupler 206 and outputs the resulting light. The OSC light receiver 208 receives the OSC light output from the OSC coupler 206. The OSC light receiver 208 outputs the control signal included in the received OSC light to the on/off switching unit 209.

On the basis of the control signal output from the OSC light receiver 208, the on/off switching unit 209 switches ON/OFF of outputting of the ASE light from the transmitting-side optical amplifier 101. The on/off switching unit 209 may be realized by, for example, an arithmetic operation circuit, such as an FPGA.

Figure 3A:
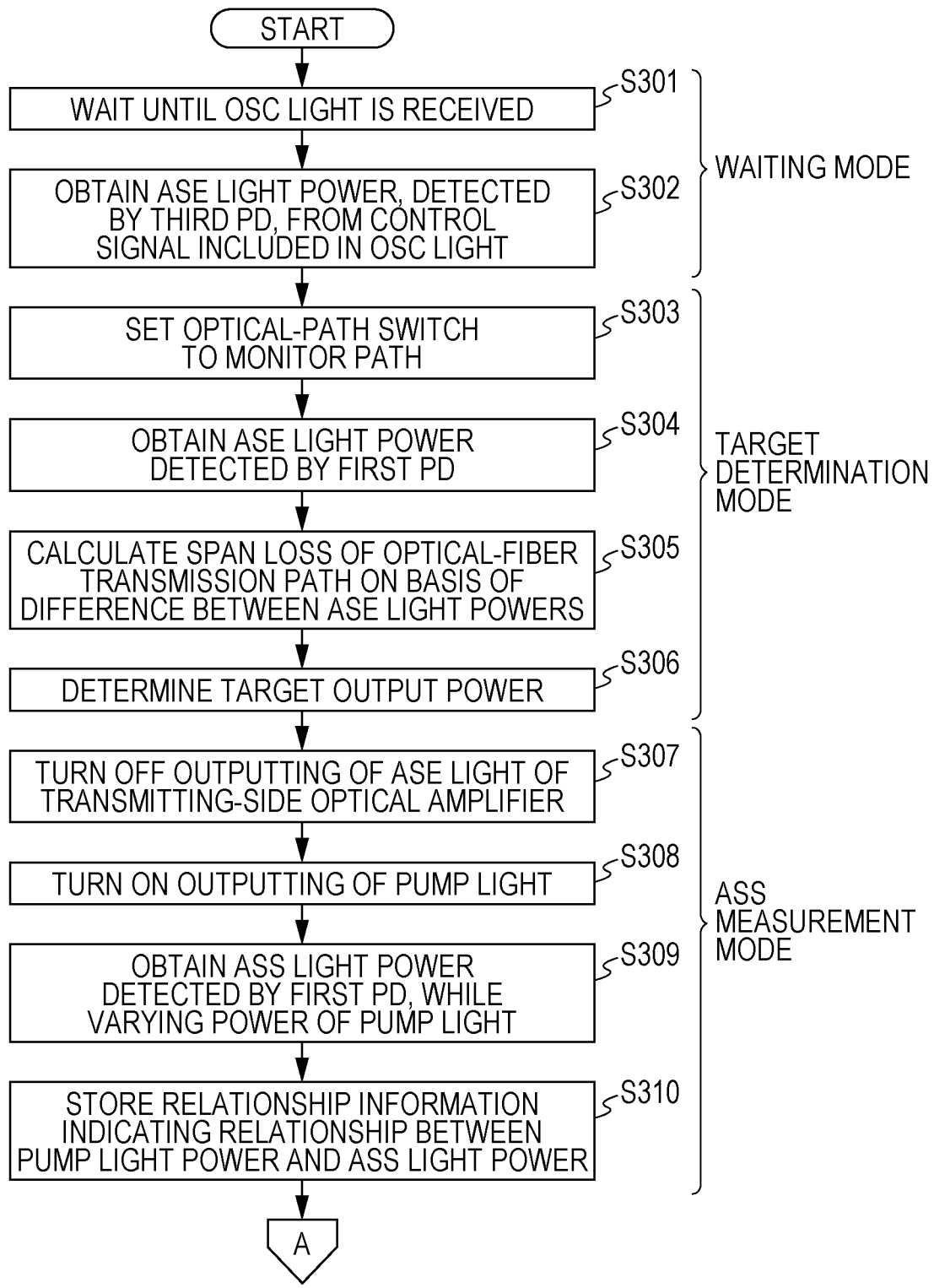
FIG. 3A is a flowchart (part 1) illustrating one example of operations of a control circuit in the second embodiment during startup.

FIGS. 3A and 3B are flowcharts illustrating one example of operations when a control circuit in the second embodiment is started up. The control circuit 127 executes, for example, following steps as startup operations when power is turned on. It is assumed that, during startup operation of the control circuit 127, the optical-fiber transmission path 102 does not transmit any signal light. It is also assumed that, startup of the transmission system 100 is sequentially completed from the upstream side of an optical signal and, during startup operation of the control circuit 127, the startup of the transmitting-side optical amplifier 101 has been completed and ASE light is output the transmitting-side optical amplifier 101.

Since pump light used for Raman amplification generally has a high power, it is desired that no pump light is output from the LD 121 until it is confirmed that the amplifying apparatus 120 is connected to the optical-fiber transmission path 102. Thus, it is assumed that no pump light is output from the LD 121 during the startup operation when power is turned on.

As illustrated in FIG. 3A, the control circuit 127 first enters a waiting mode in which reception of OSC light from the transmitting side is waited for. More specifically, in step S301, the control circuit 127 waits until the OSC light receiver 212 receives OSC light. When no OSC light is received in step S301, for example, erroneous fiber connection or the like is fixed or the completion of startup of the transmitting-side optical amplifier 101 is waited for so as to allow the OSC light receiver 212 to receive OSC light. When OSC light is received, the process proceeds to step S302 in which the control circuit 127 obtains the ASE light power, detected by the third PD 202, from the control signal included in the received OSC light.

Next, on the basis of a result of the detection of the ASE light power, the control circuit 127 enters a target determination mode in which a target output power is determined. Specifically, in step S303, the control circuit 127 sets the optical-path switch 123 to the monitor path 123a. As a result, the first PD 124 receives ASE light that was output from the transmitting-side optical amplifier 101, that suffered loss through the optical-fiber transmission path 102, and that arrived at the amplifying apparatus 120.

Next, in step S304, the control circuit 127 obtains the ASE light power detected by the first PD 124. In step S305, on the basis of the difference between the ASE light power obtained in step S302 and the ASE light power obtained in step S304, the control circuit 127 determines a span loss of the optical-fiber transmission path 102. For example, the control circuit 127 calculates a span loss by subtracting the receiving-side ASE light power obtained in step S304 from the transmitting-side ASE light power obtained in step S302.

Next, in step S306, the control circuit 127 determines a target output power of the amplifying apparatus 120. For example, the control circuit 127 determines, as a target output power, a result obtained by subtracting the span loss calculated in step S305 from the transmitting-side ASE light power obtained in step S302 and adding a predetermined setting gain to the result of the subtraction.

Next, the control circuit 127 enters an ASS measurement mode in which a relationship between the power of pump light and the power of ASS light is obtained. More specifically, in step S307, the control circuit 127 causes the OSC light transmitter 213 to transmit OSC light to control the on/off switching unit 209 to thereby turn off the outputting of the ASE light of the transmitting-side optical amplifier 101. Next, in step S308, the control circuit 127 turns on the pump-light outputting performed by the LD 121. Thus, the ASS light that has arrived at the amplifying apparatus 120 is received by the first PD 124.

In step S309, the control circuit 127 obtains the ASS light power detected by the first PD 124, while varying the power of the pump light of the LD 121. In step S310, on the basis of a result of step S309, the control circuit 127 stores, in the storage unit 226, the relationship information indicating the relationship between the pump light power and the ASS light power. The control circuit 127 may also store the relationship information, which indicates the relationship between the pump light power and the ASS light power, in the storage unit 226 in parallel with execution of step S309.

Subsequently, the control circuit 127 proceeds to step S311 (reference character A) illustrated in FIG. 3B in which it enters the pump-power setting mode in which the power of pump light is set. More specifically, in step S311, the control circuit 127 causes the OSC light transmitter 213 to transmit OSC light to control the on/off switching unit 209 to thereby turn on the outputting of ASE light of the transmitting-side optical amplifier 101. Thus, the ASE light and ASS light that arrive at the amplifying apparatus 120 are received by the first PD 124.

In step S312, the control circuit 127 drives the LD 121 to set the power of the pump light of the LD 121 to have a predetermined value. The predetermined value set in step S312 is power that is sufficiently smaller than an appropriate power of pump light.

In step S313, on the basis of the present power of the pump light of the LD 121 and the relationship information stored in step S310, the control circuit 127 derives the power of the ASS light. In step S314, the control circuit 127 obtains a total of the ASE light power and the ASS light power detected by the first PD 124.

Next, in step S315, the control circuit 127 calculates the power of the ASE light by subtracting the ASS light power derived in step S313 from the total power obtained in step S314. Next, in step S316, the control circuit 127 calculates a difference between the target output power determined in step S306 and the ASE light power calculated in step S315.

Next, in step S317, the control circuit 127 determines whether or not the difference calculated in step S316 is smaller than or equal to a threshold. When the difference is not smaller than or equal to the threshold (No in step S317), the process proceeds to step S318 in which the control circuit 127 increases the power of the pump light of the LD 121. Thereafter, the process returns to step S313.

When the difference is smaller than or equal to the threshold (Yes in step S317), the process of the control circuit 127 proceeds to step S319. In step S319, the control circuit 127 enters a working mode in which it controls the power of the pump light of the LD 121 while Raman-amplifying the signal light and outputting the amplified signal light to the receiving-side optical amplifier 103. The control circuit 127 then ends the series of the startup operations.

FIG. 4 is a flowchart illustrating one example of operations of a control circuit in the second embodiment in the working mode. The control circuit 127 executes the following steps as operations in the working mode. It is assumed that, in the working mode, transmission of signal light through the optical-fiber transmission path 102 has been started. First, in step S401, the control circuit 127 sets the optical-path switch 123 to the working path 123b. As a result, signal light and ASS light that arrive at the amplifying apparatus 120 are received by the second PD 126.

In step S402, on the basis of the present power of the pump light of the LD 121 and the relationship information stored in the storage unit 226 in step S310 illustrated in FIG. 3A, the control circuit 127 derives the power of the ASS light. Next, in step S403, the control circuit 127 obtains a total of the signal light power and the ASS light power detected by the second PD 126.

In step S404, the control circuit 127 calculates the power of the signal light by subtracting the ASS light power, derived in step S402, from the total power obtained in step S403. In step S405, the control circuit 127 determines, as a target signal power, the signal light power calculated in step S404.

In step S406, the control circuit 127 derives the power of the ASS light on the basis of the present power of the pump light of the LD 121 and the relationship information stored in the storage unit 226 in step S310 illustrated in FIG. 3A. In step S407, the control circuit 127 obtains a total of the signal light power and the ASS light power detected by the second PD 126.

Next, in step S408, the control circuit 127 calculates the power of the signal light by subtracting the ASS light power, derived in step S406, from the total power obtained in step S407. In step S409, the control circuit 127 calculates a difference between the target signal power determined in step S405 and the signal light power calculated in step S408.

Next, in step S410, the control circuit 127 adjusts the power of the pump light of the LD 121 so that the difference calculated in step S409 decreases. Thereafter, the process returns to step S406. In step S410, for example, in accordance with the polarity of the calculated difference, the control circuit 127 determines a direction in which the power of the pump light is varied (increased or reduced). The control circuit 127 also determines, for example, an amount by which the power of the pump light is to be varied, in accordance with the value of the difference. With such an arrangement, the power of the signal light output from the amplifying apparatus 120 can be maintained at the power obtained upon start of the working mode.

The control circuit 127 may also control the power of the pump light so as to maintain the power of signal light per wavelength channel. For example, in step S405, the control circuit 127 may determine, as a target signal power per wavelength channel, a result obtained by dividing the signal light power, calculated in step S404, by the number of wavelength channels.

In addition, in step S409, the control circuit 127 calculates a difference between the target signal power determined in step S405 and the result obtained by dividing the signal light power, calculated in step S408, by the number of wavelength channels. With this arrangement, even when the number of wavelength channels included in signal light changes, the power of pump light can be controlled so that the power of the signal light per wavelength channel is maintained. However, controlling the power of the pump light during the operation in the working mode is not limited to the above-described method and may be realized by various control methods.

As illustrated in FIGS. 3A, 3B, and 4, the control circuit 127 sets the optical-path switch 123 to the monitor path 123a before signal light is transmitted through the optical-fiber transmission path 102, and stores information based on a result of the light reception performed by the first PD 124. In addition, when signal light is transmitted through the optical-fiber transmission path 102, the control circuit 127 sets the optical-path switch 123 to the working path 123b to control the power of pump light.

More specifically, while varying the power of pump light when no light is transmitted from the transmitting side through the optical-fiber transmission path 102, the control circuit 127 obtains the power of light output to the first PD 124 through the working path 123b with low loss. With this arrangement, it is possible to store the relationship information accurately indicating the relationship between the power of pump light and the power of noise light resulting from inputting of the pump light.

When signal light is transmitted through the optical-fiber transmission path 102, the control circuit 127 derives the power of noise light resulting from inputting of pump light, on the basis of the stored relationship information and the power of the pump light. Next, the control circuit 127 subtracts the derived noise light power from the power of first light output by the optical splitter 125. With this arrangement, it is possible to accurately calculate the power of the signal light. Accordingly, the amount of error in the Raman gain can be reduced through the pump light power control based on the calculated power.

Also, for example, when ASE light (noise light) is transmitted through the optical-fiber transmission path 102 before signal light is transmitted through the optical-fiber transmission path 102, the control circuit 127 sets the optical-path switch 123 to the monitor path 123a. The control circuit 127 then calculates a target power on the basis of the power of light output to the first PD 124 and controls the power of pump light so that the calculated signal light power approaches the target power when signal light is transmitted through the optical-fiber transmission path 102.

As described above, the amplifying apparatus 120 according to the second embodiment has the optical-path switch 123 that is capable of switching the output path of the received light between the working path 123b and the monitor path 123a. Thus, the received light can be monitored with low loss through use of the monitor path 123a in a non-working time. With this arrangement, in a working time, signal light is transmitted to a subsequent stage through the working path 123b and, in a non-working time, the power of pump light can be controlled based on a result of the low-loss monitoring of the received light in the non-working time. Thus, it is possible to reduce the amount of error in the Raman gain.

In addition, since the optical splitter 125 is provided at a stage subsequent to the optical-path switch 123, it is possible to reduce the amount of loss of light output through the monitor path 123a in the optical-path switch 123. Thus, in the non-working time, the received light can be monitored with low loss. Accordingly, the amount of error in the Raman gain can be reduced.

Third Embodiment

Figure 5A:
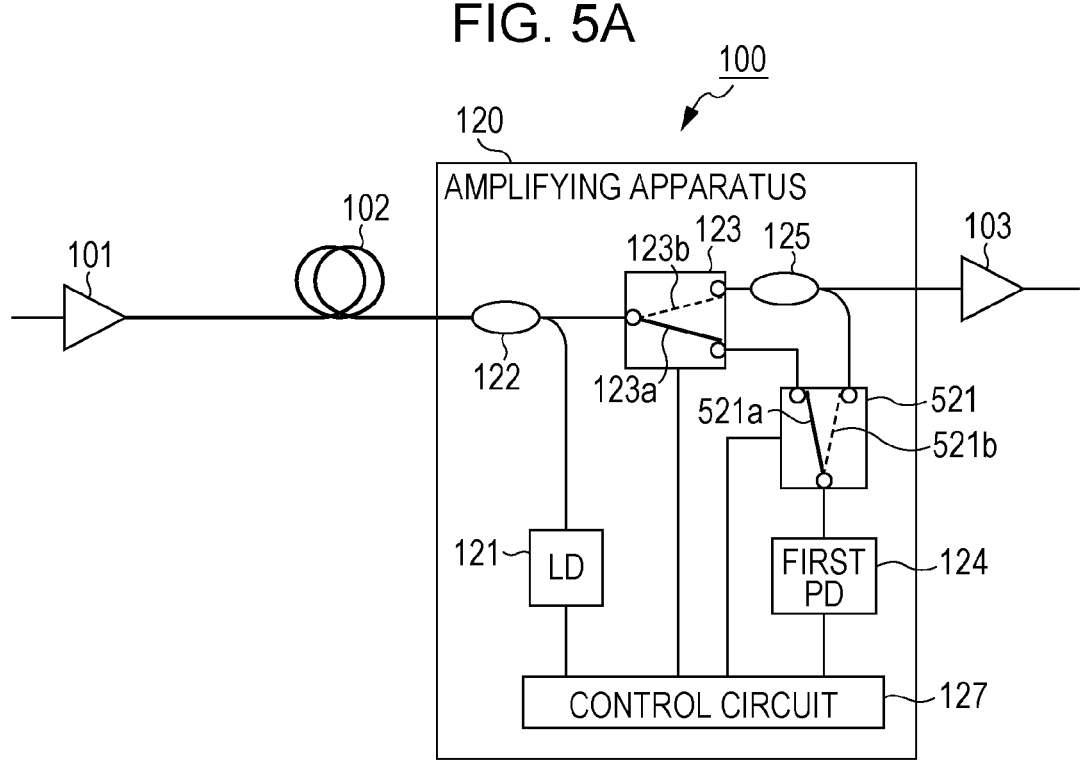
FIG. 5A is a diagram illustrating one example of the configuration of a transmission system according to a third embodiment.
Figure 5B:
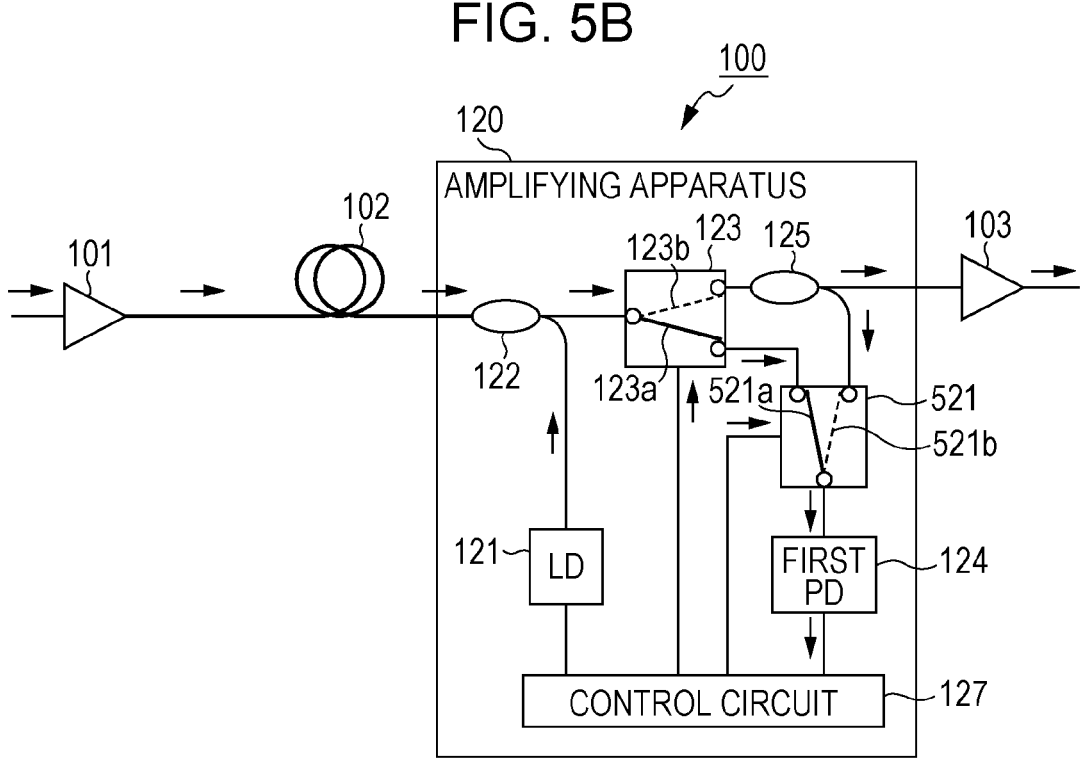
FIG. 5B is a diagram illustrating one example of flows of light and electrical signals in the transmission system illustrated in FIG. 5A.

FIG. 5A is a diagram illustrating one example of the configuration of a transmission system according to a third embodiment. FIG. 5B a diagram illustrating one example of flows of light and electrical signals in the transmission system illustrated in FIG. 5A. In FIGS. 5A and 5B, elements that are substantially the same as those illustrated in FIGS. 1A and 1B are denoted by the same reference numerals and descriptions thereof are not given hereinafter.

As illustrated in FIGS. 5A and 5B, an amplifying apparatus 120 according to the third embodiment has an optical-path switch 521 instead of the second PD 126 illustrated in FIGS. 1A and 1B. A monitor path 123a in an optical-path switch 123 serves as a path through which light output from a WDM coupler 122 is output to the optical-path switch 521. An optical splitter 125 splits the light and outputs resulting first light and second light to the optical-path switch 521 and a receiving-side optical amplifier 103, respectively.

The optical-path switch 521 is capable of switching between a monitor path 521a through which the light output from the optical-path switch 123 is output to a first PD 124 and a working path 521b through which the light output from the optical splitter 125 is output to the first PD 124. The path switching of the optical-path switch 521 is controlled according to a switching signal output from a control circuit 127. The optical-path switch 521 realizes a second path switching unit that is capable of switching between a third state in which the light output through the monitor path 123a in the optical-path switch 123 is output and a fourth state in which the first light output by the optical splitter 125 is output.

In either of the first and second states, the control circuit 127 controls the power of the pump light of an LD 121 on the basis of power indicated by information output from the first PD 124. The control circuit 127 also outputs the switching signal to the optical-path switch 521 to thereby control the path switching of the optical-path switch 521.

More specifically, in a first state (for example, during startup), the control circuit 127 sets the optical-path switch 123 to the monitor path 123a and also sets the optical-path switch 521 to the monitor path 521a. Thus, the first PD 124 can receive light in the amplifying apparatus 120 with low loss and can detect the power of the received light with high accuracy, so that the power of pump light can be controlled based on the power detected with high accuracy.

Also, in a second state (for example, in a working time), the control circuit 127 sets the optical-path switch 123 to the working path 123b and also sets the optical-path switch 521 to the working path 521b. With this arrangement, it is possible to detect the power of received light in the amplifying apparatus 120 while outputting the received light to the receiving-side optical amplifier 103. In addition, the power of pump light can be controlled based on the detected power.

As described above, in the amplifying apparatus 120 according to the third embodiment, the optical-path switch 123 is set to the monitor path 123a and the optical-path switch 521 is set to the monitor path 521a to thereby allow storage of information based on a result of reception of light output from the optical-path switch 521. Then, the optical-path switch 123 is set to the working path 123b and the optical-path switch 521 is set to the working path 521b, so that the power of pump light can be controlled based on the stored information and the result of the reception of the light output from the optical-path switch 521.

With this arrangement, one PD (the first PD 124) can receive the light output through the monitor path 123a in the optical-path switch 123 and the light output through the working path 123b in the optical-path switch 123 and split by the optical splitter 125.

Fourth Embodiment

Figure 6A:
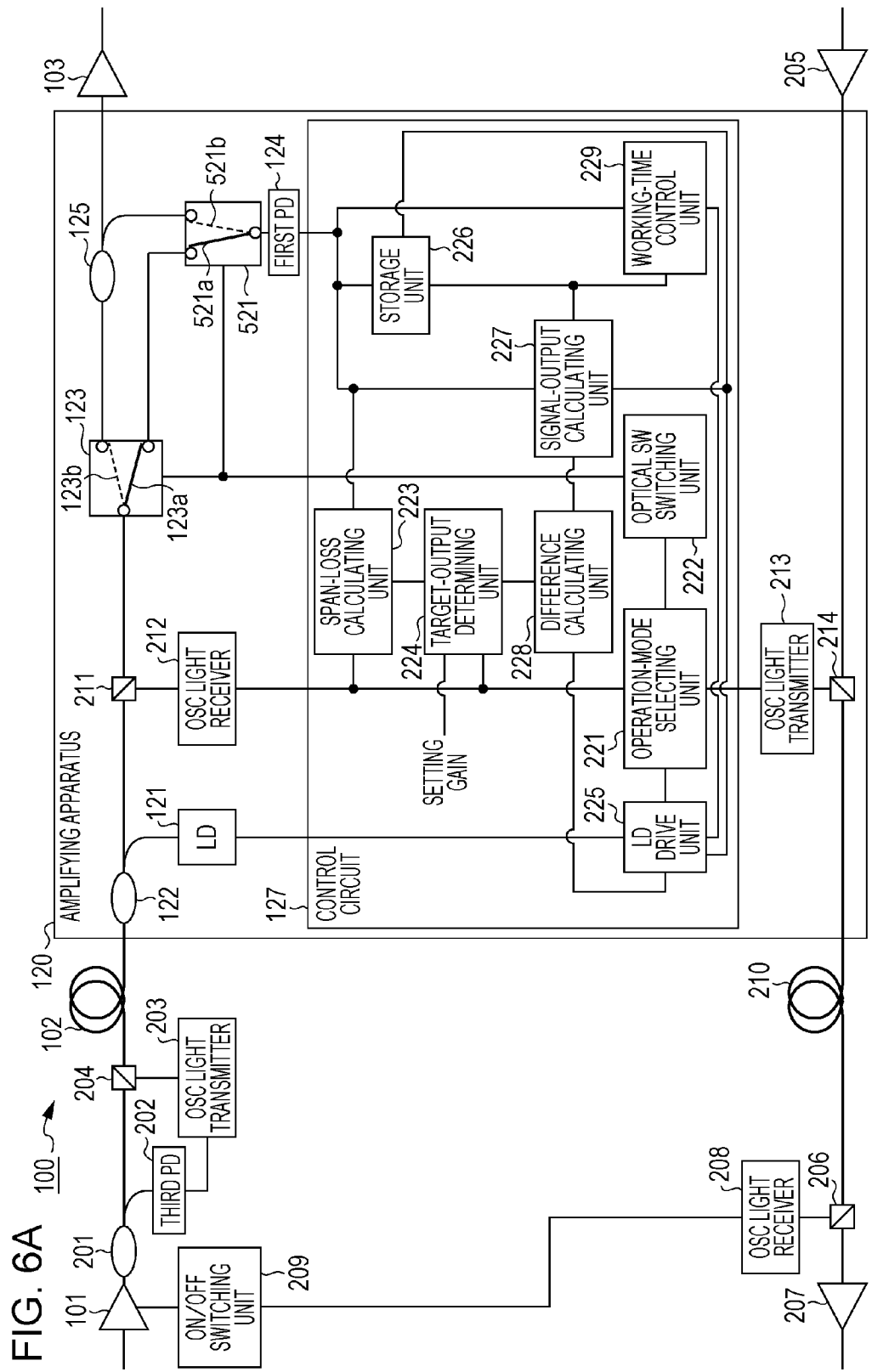
FIG. 6A is a diagram illustrating one example of the configuration of a transmission system according to a fourth embodiment.
Figure 6B:
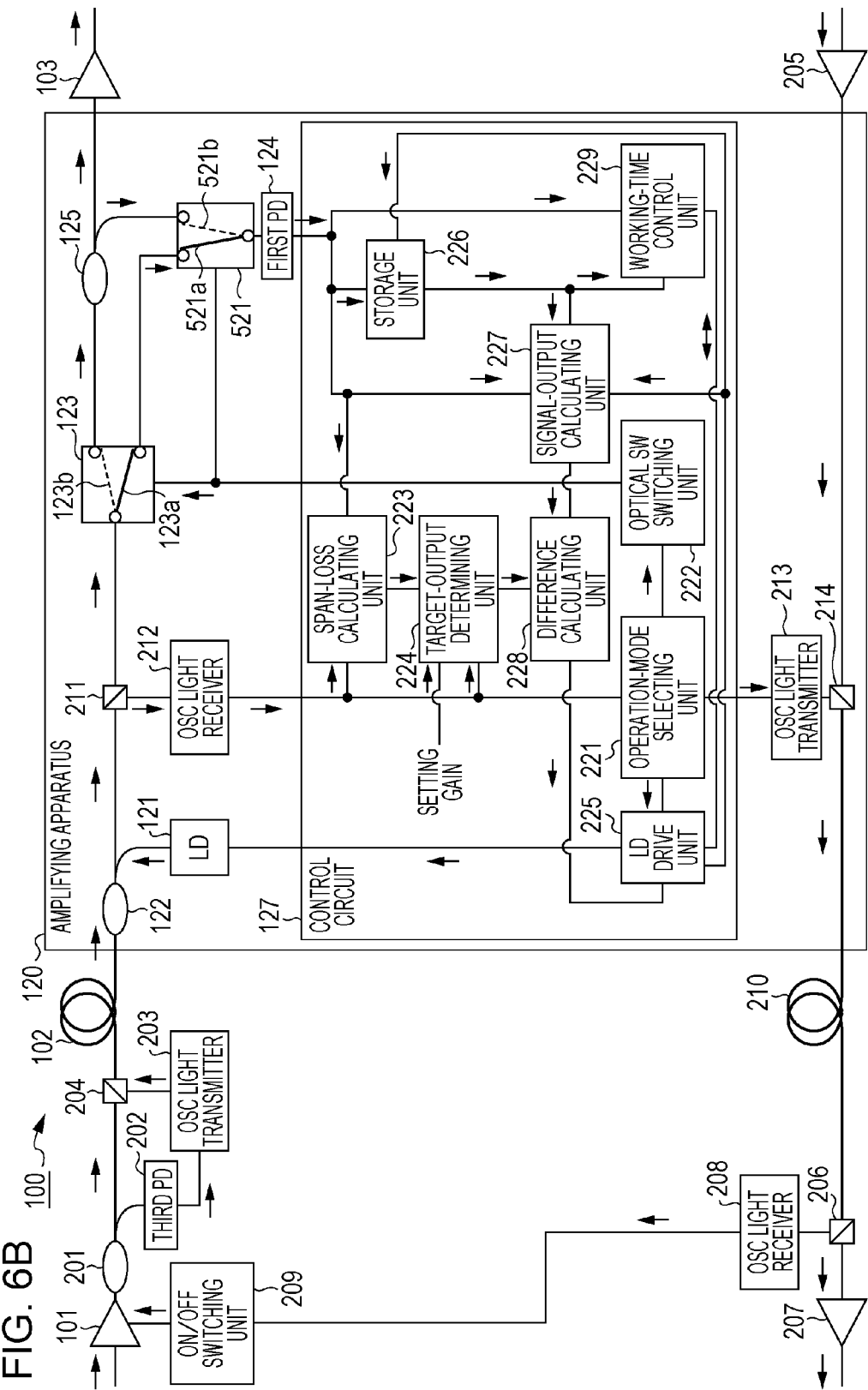
FIG. 6B is a diagram illustrating one example of flows of light and electrical signals in the transmission system illustrated in FIG. 6A.

FIG. 6A is a diagram illustrating one example of the configuration of a transmission system according to a fourth embodiment. FIG. 6B a diagram illustrating one example of flows of light and electrical signals in the transmission system illustrated in FIG. 6A. In FIGS. 6A and 6B, elements that are substantially the same as those illustrated in FIGS. 2A and 2B or FIGS. 5A and 5B are denoted by the same reference numerals, and descriptions thereof are not given hereinafter.

As illustrated in FIGS. 6A and 6B, a transmission system 100 according to the fourth embodiment has an optical-path switch 521 instead of the second PD 126 illustrated in FIGS. 2A and 2B. A working-time control unit 229 obtains power indicated by information output from a first PD 124.

Figure 7A:
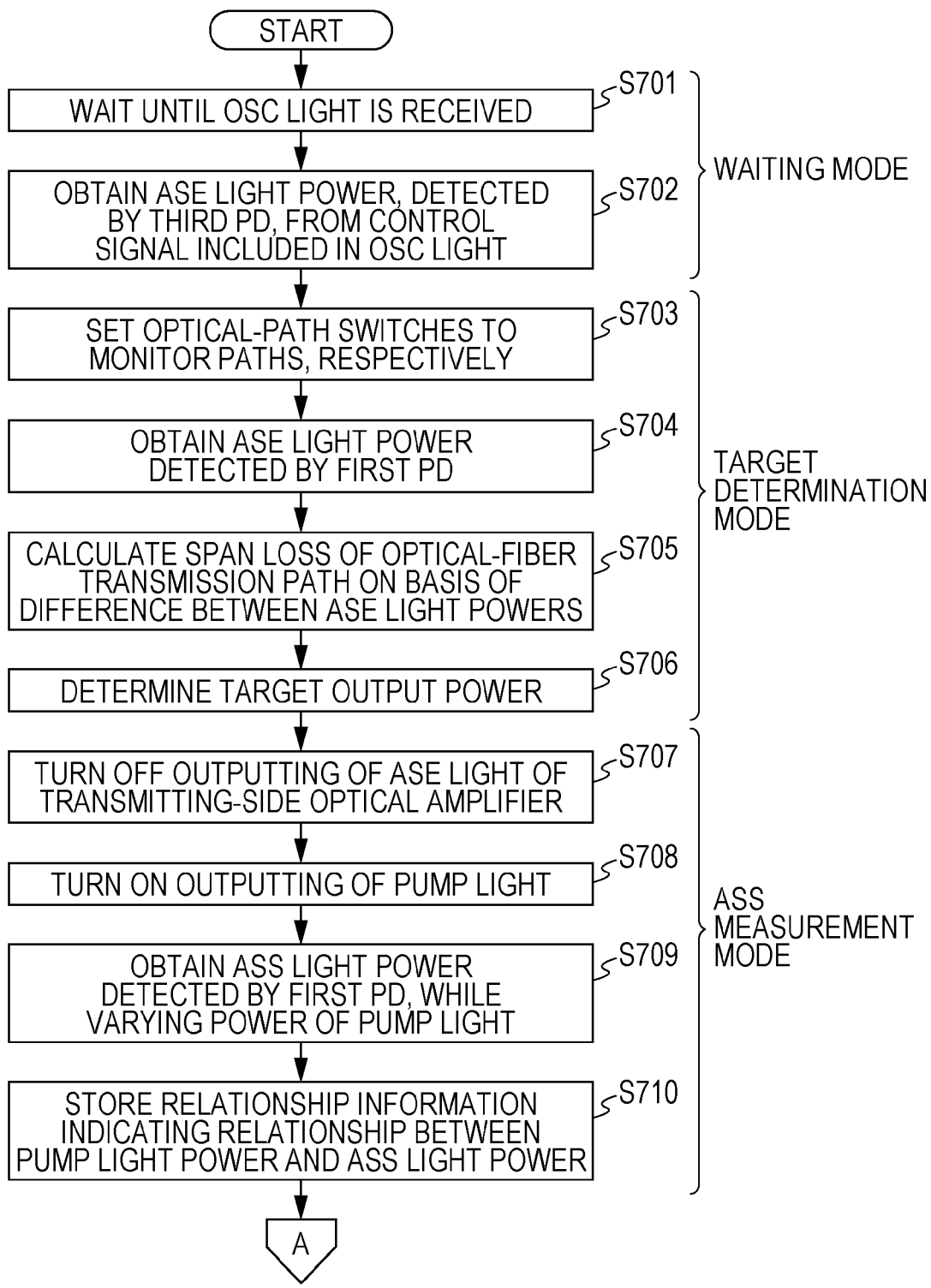
FIG. 7A is flowchart (part 1) illustrating one example of operations of a control circuit in the fourth embodiment during startup.

FIGS. 7A and 7B are flowcharts illustrating one example of operations when a control circuit in the fourth embodiment is started up. The control circuit 127 in the fourth embodiment executes, for example, the following steps as startup operations when power is turned on. Steps S701 to S719 illustrated in FIGS. 7A and 7B are substantially the same as those in steps S301 to S319 illustrated FIG. 3.

However, in step S703, the control circuit 127 sets the optical-path switches 123 and 521 to the monitor paths 123a and 521a, respectively. As a result, ASE light that was output from the transmitting-side optical amplifier 101 and that suffered loss through the optical-fiber transmission path 102 is received by the first PD 124 with low loss.

Figure 8:
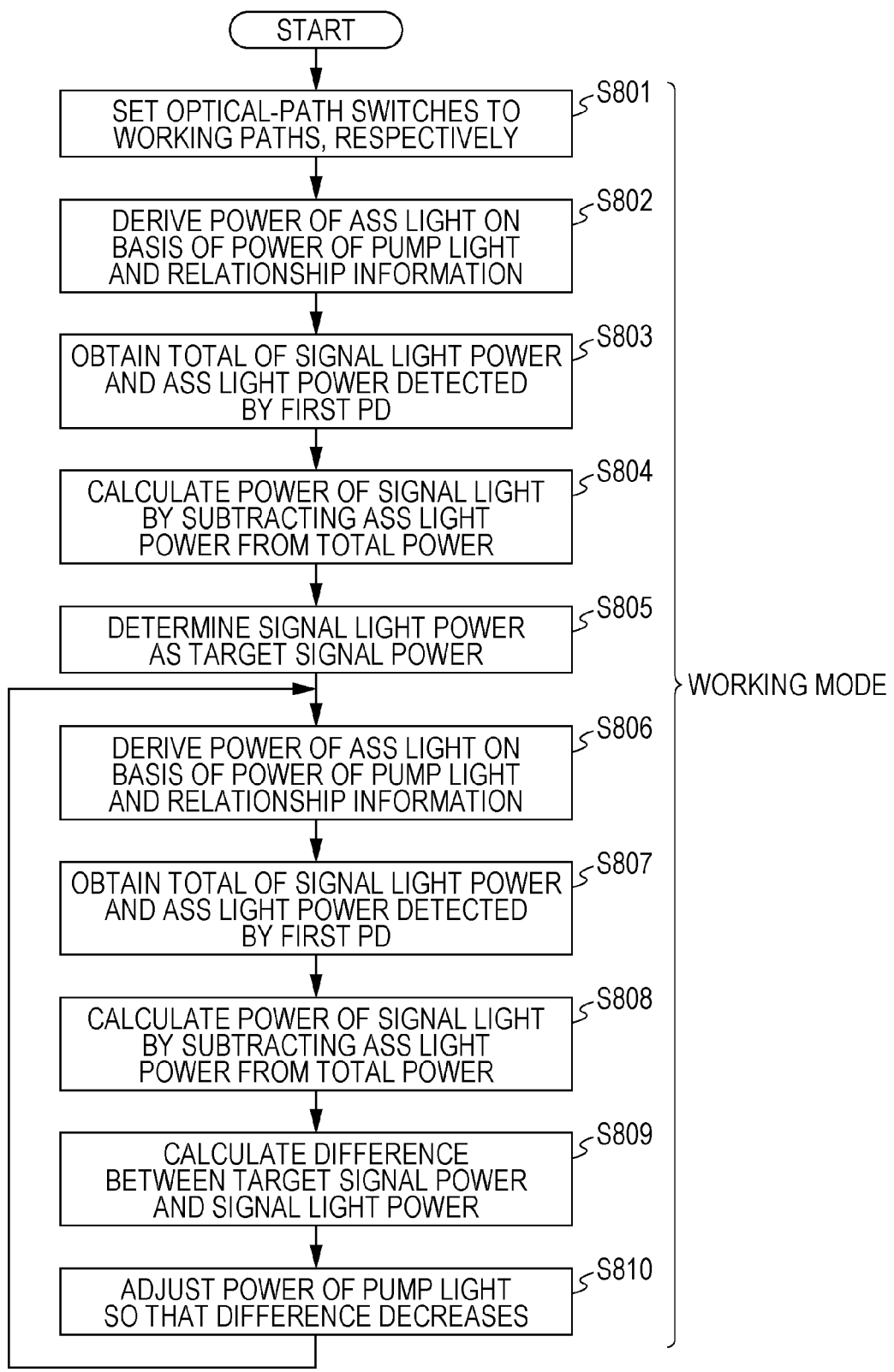
FIG. 8 is a flowchart illustrating one example of an operation of the control circuit in the fourth embodiment in the working mode.

FIG. 8 is a flowchart illustrating one example of an operation of the control circuit in the fourth embodiment in the working mode. The control circuit 127 in the fourth embodiment executes the following steps as operations in the working mode. It is assumed that, in the working mode, transmission of signal light through the optical-fiber transmission path 102 has already been started.

First, in step S801, the control circuit 127 sets the optical-path switches 123 and 521 to the working paths 123b and 521b, respectively. Thus, while signal light is output to the receiving-side optical amplifier 103, signal light and ASS light are received by the first PD 124. Steps S802 to S810 illustrated in FIG. 8 are substantially the same as steps S402 to S410 illustrated in FIG. 4. However, in steps S803 and S807, the control circuit 127 obtains a total of the signal light power and the ASS light power detected by the first PD 124.

As described above, in the amplifying apparatus 120 in the fourth embodiment, the optical-path switch 123 is set to the monitor path 123a and the optical-path switch 521 is set to the monitor path 521a to thereby allow storage of information based on a result of the reception of the light output from the optical-path switch 521. In addition, the optical-path switch 123 is set to the working path 123b and the optical-path switch 521 is set to the working path 521b, so that the power of pump light can be controlled based on the stored information and the result of the reception of the light output from the optical-path switch 521.

With this arrangement, one PD (the first PD 124) can receive the light output through the monitor path 123a in the optical-path switch 123 and the light output through the working path 123b in the optical-path switch 123 and split by the optical splitter 125.

Fifth Embodiment

Figure 9A:
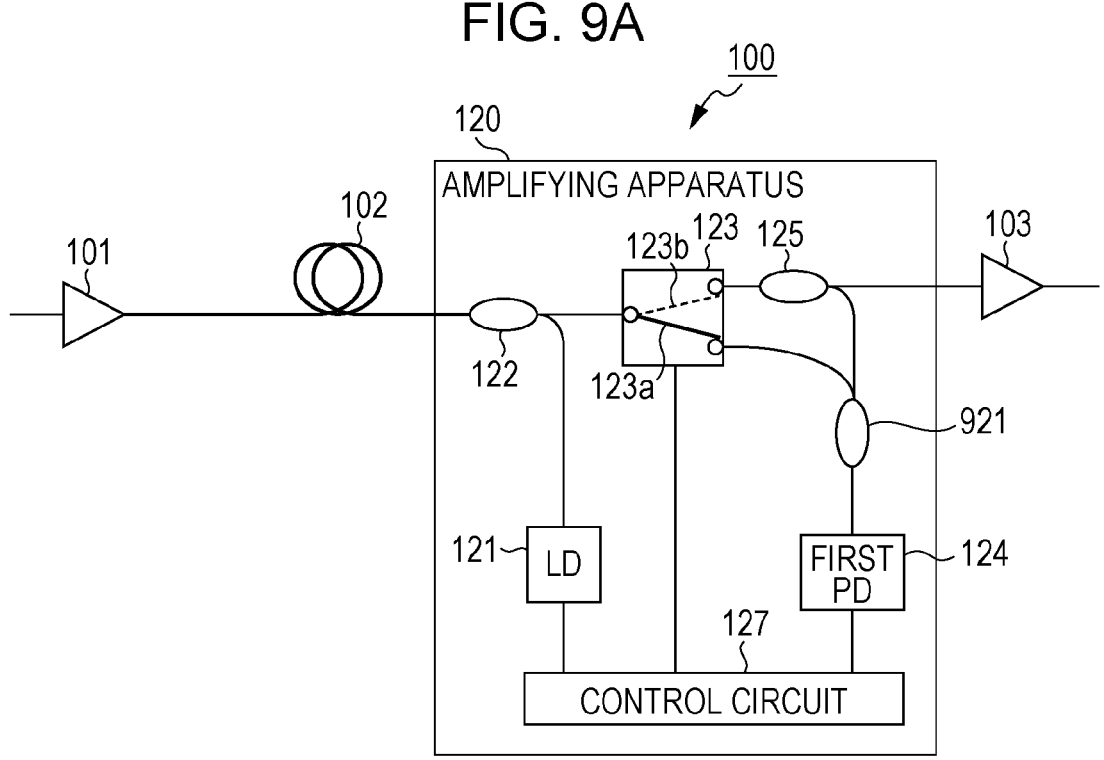
FIG. 9A is a diagram illustrating one example of the configuration of a transmission system according to a fifth embodiment.
Figure 9B:
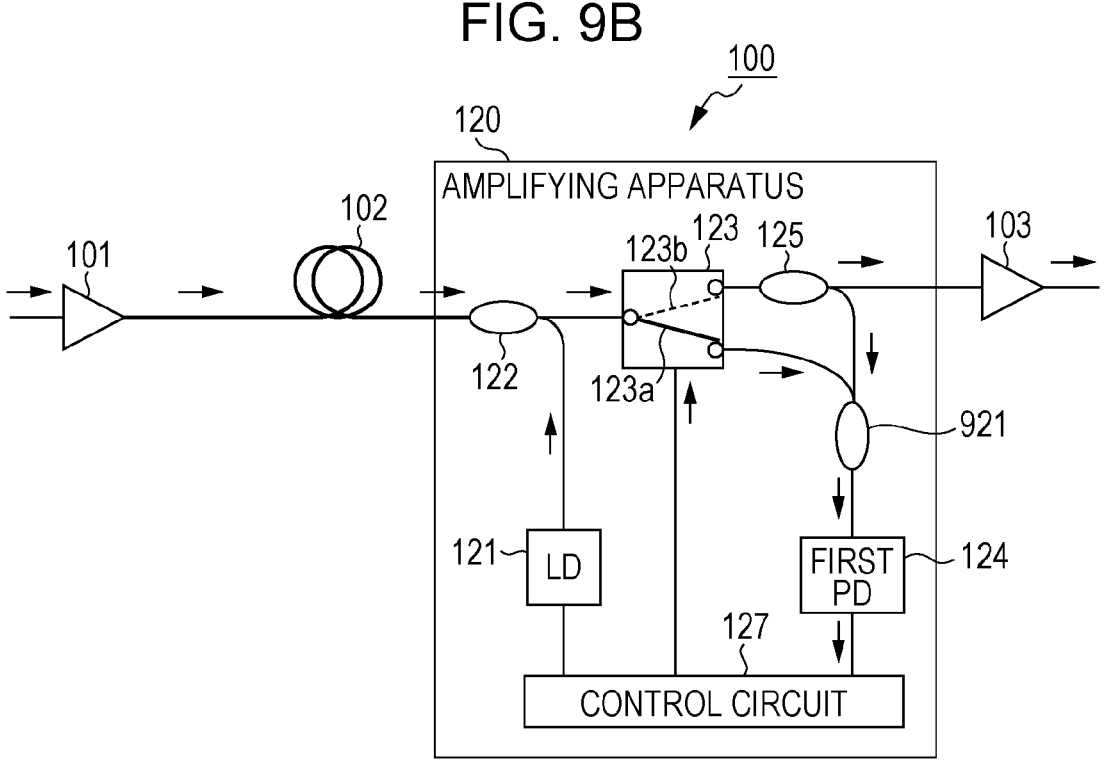
FIG. 9B is a diagram illustrating one example of light and electrical signals in the transmission system illustrated in FIG. 9A.

FIG. 9A is a diagram illustrating one example of the configuration of a transmission system according to a fifth embodiment. FIG. 9B a diagram illustrating one example of light and electrical signals in the transmission system illustrated in FIG. 9A. In FIGS. 9A and 9B, elements that are substantially the same as those illustrated in FIGS. 1A and 1B are denoted by the same reference numerals, and descriptions thereof are not given hereinafter. As illustrated in FIGS. 9A and 9B, an amplifying apparatus 120 according to the fifth embodiment has an optical multiplexer 921 instead of the second PD 126 illustrated in FIGS. 1A and 1B.

A monitor path 123a in an optical-path switch 123 serves as a path through which light output from a WDM coupler 122 is output to the optical multiplexer 921. An optical splitter 125 splits light and outputs resulting first light and second light to the optical multiplexer 921 and a receiving-side optical amplifier 103, respectively. The optical multiplexer 921 outputs the light, output from the optical-path switch 123, and the second light, output from the optical splitter 125, to a first PD 124.

As described above, the amplifying apparatus 120 according to the fifth embodiment has the optical multiplexer 921 that outputs the light output through the monitor path 123a in the optical-path switch 123 and the first light output by the optical splitter 125. With this arrangement, one PD (the first PD 124) can receive the light output through the monitor path 123a in the optical-path switch 123 and the light output through a working path 123b in the optical-path switch 123 and split by the optical splitter 125.

Thus, with such a simple configuration, it is possible to receive the light output through the monitor path 123a in the optical-path switch 123 and the light output through the working path 123b in the optical-path switch 123 and split by the optical splitter 125.

Sixth Embodiment

Figure 10A:
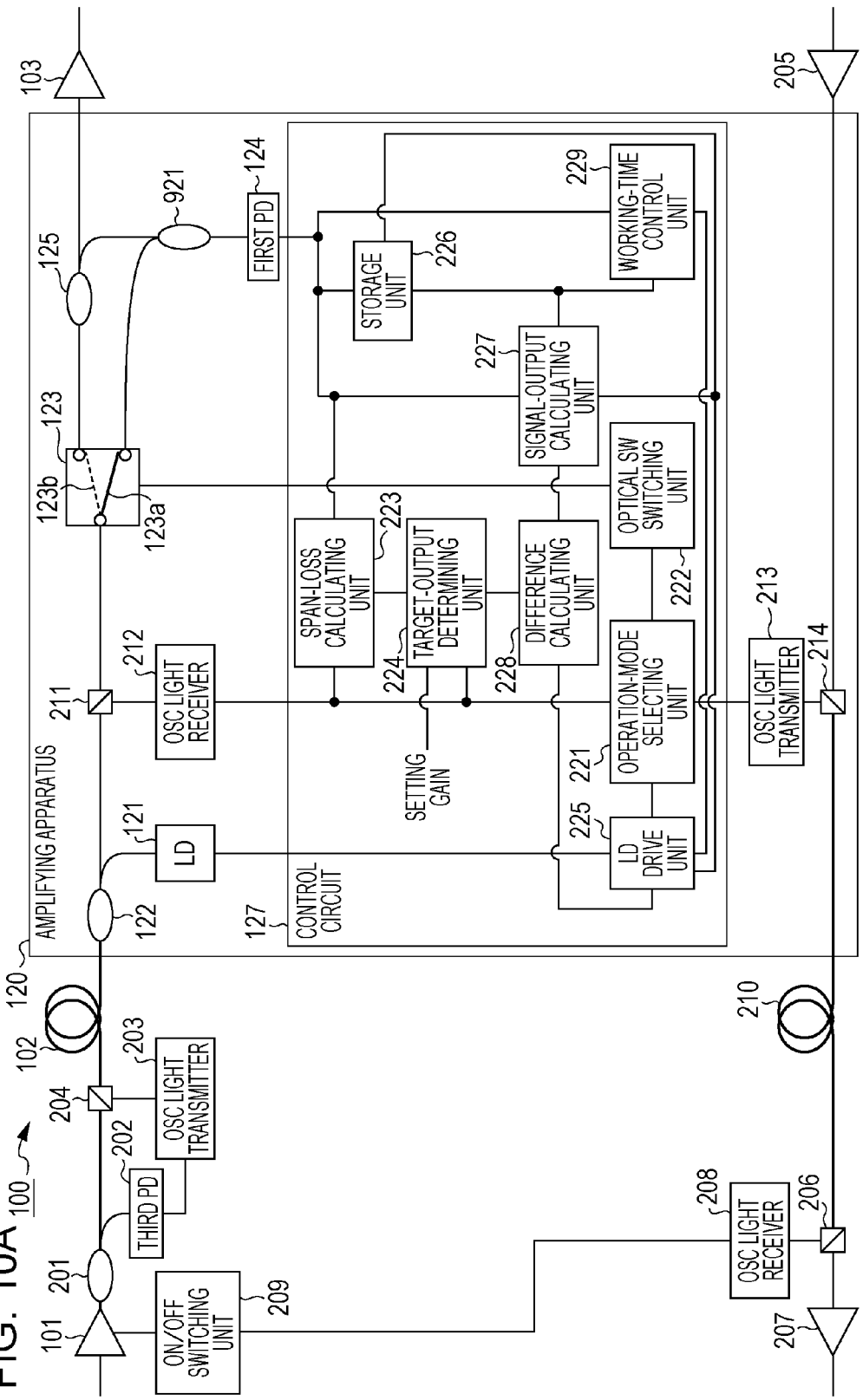
FIG. 10A is a diagram illustrating one example of the configuration of a transmission system according to a sixth embodiment.
Figure 10B:
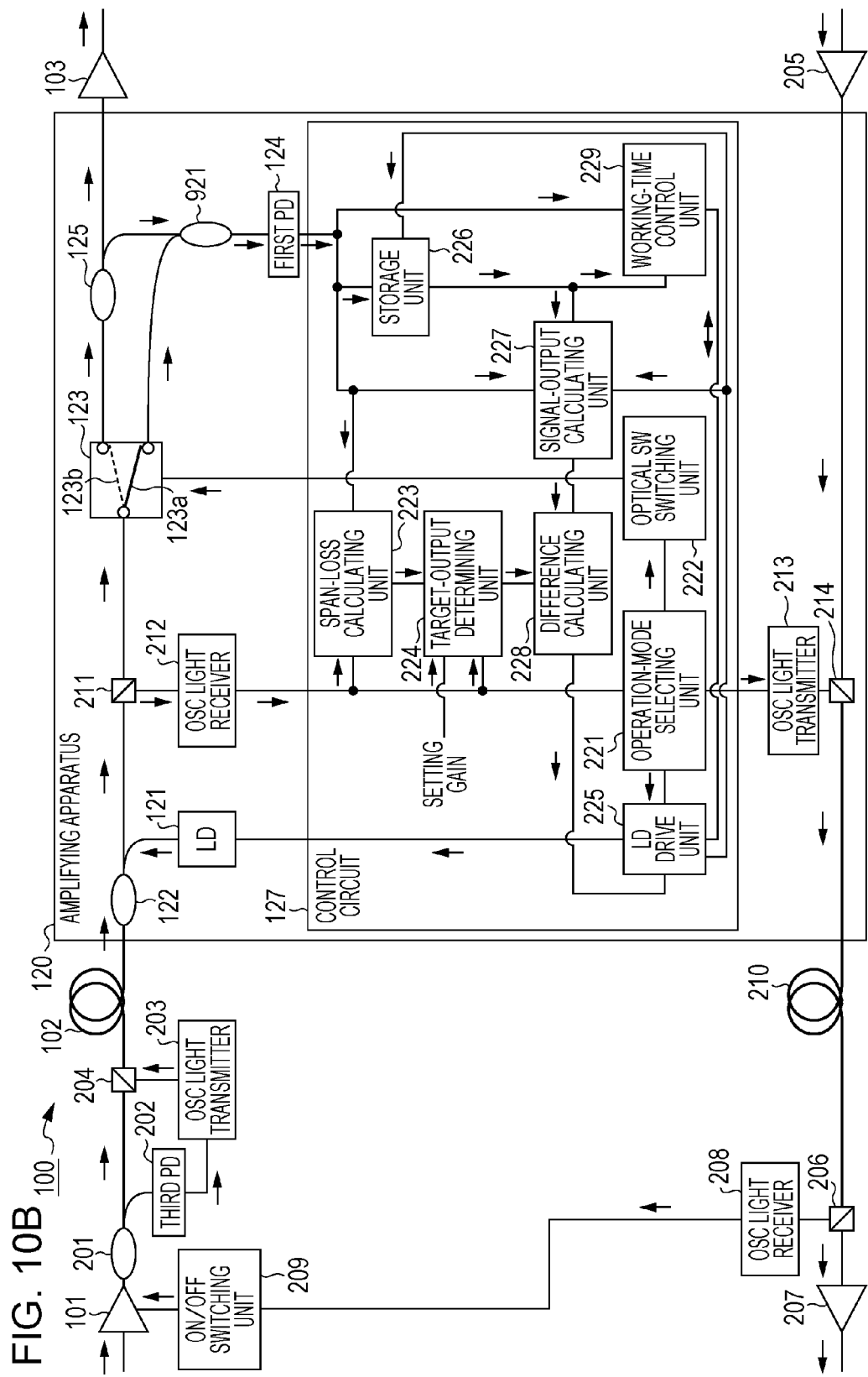
FIG. 10B is a diagram illustrating one example of flows of light and electrical signals in the transmission system illustrated in FIG. 10A.

FIG. 10A a diagram illustrating one example of the configuration of a transmission system according to a sixth embodiment. FIG. 10B a diagram illustrating one example of flows of light and electrical signals in the transmission system illustrated in FIG. 10A. In FIGS. 10A and 10B, elements that are substantially the same as those illustrated in FIGS. 2A and 2B or FIGS. 9A and 9B are denoted by the same reference numerals, and descriptions thereof are not given hereinafter.

As illustrated in FIGS. 10A and 10B, a transmission system 100 according to the sixth embodiment has an optical multiplexer 921 instead of the second PD 126 illustrated in FIGS. 2A and 2B. A working-time control unit 229 obtains power indicated by information output from a first PD 124.

Operations of a control circuit 127 in the sixth embodiment during startup are substantially the same as, for example, the operations illustrated in FIGS. 3A and 3B. Operations of the control circuit 127 in the sixth embodiment in the working mode are substantially the same as, for example, the operations illustrated in FIG. 4. However, in steps S403 and S407 illustrated FIG. 4, the control circuit 127 in the sixth embodiment obtains a total of the signal light power and the ASS light power detected by the first PD 124.

As described above, the amplifying apparatus 120 according to the sixth embodiment has the optical multiplexer 921 that outputs light output through a monitor path 123a in an optical-path switch 123 and first light output by the optical splitter 125. With this arrangement, one PD (the first PD 124) can receive the light output through the monitor path 123a in the optical-path switch 123 and the light output through a working path 123b in the optical-path switch 123 and split by the optical splitter 125.

Accordingly, with such a simple configuration, it is possible to receive the light output through the monitor path 123a in the optical-path switch 123 and the light output through the working path 123b in the optical-path switch 123 and split by the optical splitter 125.

Seventh Embodiment

Figure 11A:
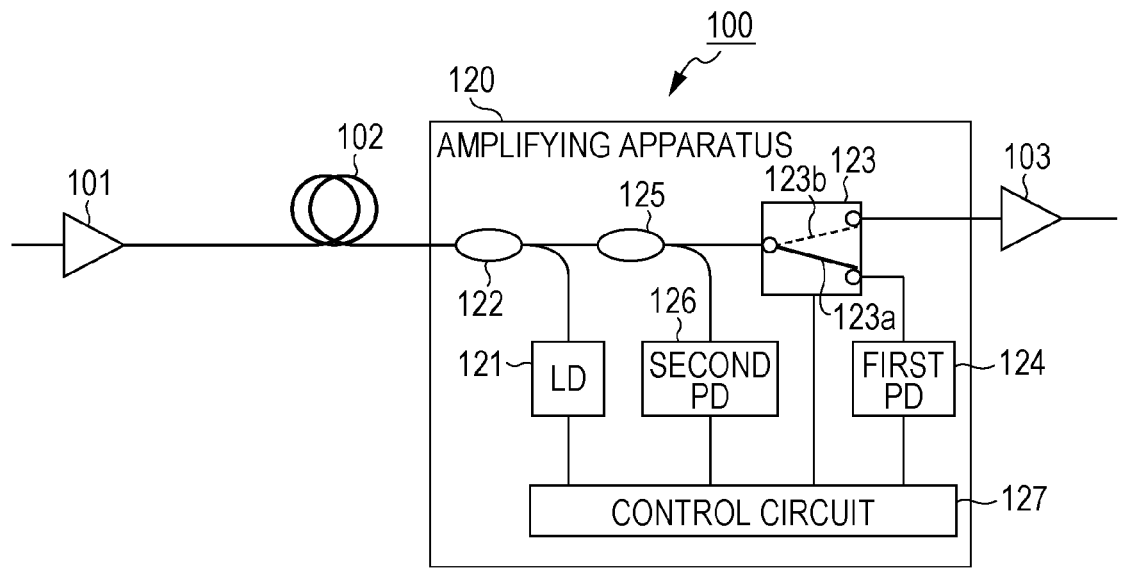
FIG. 11A is a diagram illustrating one example of the configuration of a transmission system according to a seventh embodiment.
Figure 11B:
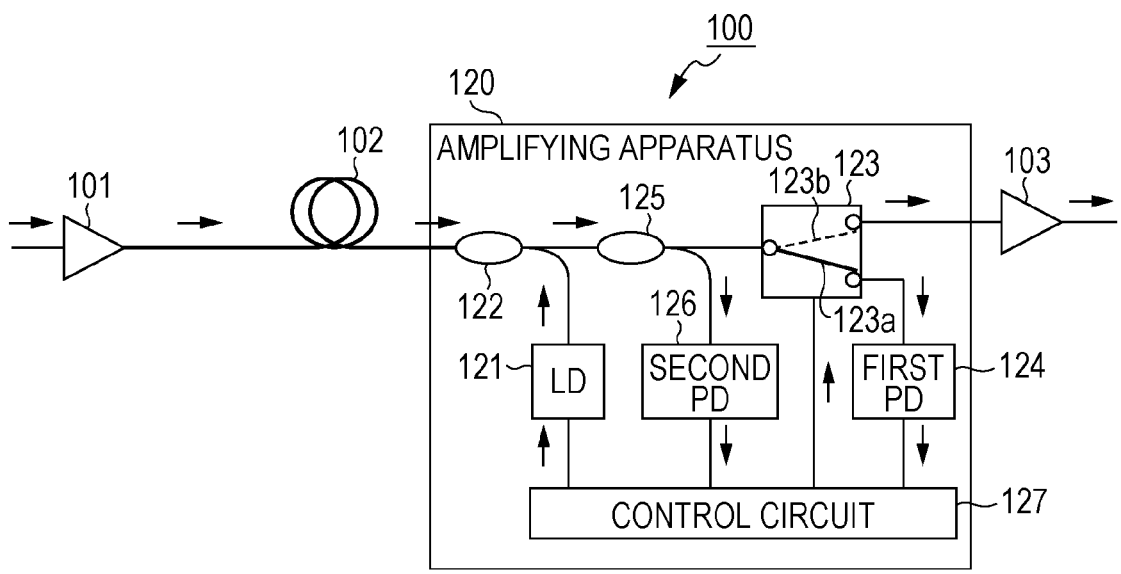
FIG. 11B is a diagram illustrating one example of flows of light and electrical signals in the transmission system illustrated in FIG. 11A.

FIG. 11A is a diagram illustrating one example of the configuration of a transmission system according to a seventh embodiment. FIG. 11B a diagram illustrating one example of flows of light and electrical signals in the transmission system illustrated in FIG. 11A. In FIGS. 11A and 11B, elements that are substantially the same as those illustrated in FIGS. 1A and 1B are denoted by the same reference numerals, and descriptions thereof are not given hereinafter.

As illustrated in FIGS. 11A and 11B, in an amplifying apparatus 120 according to the seventh embodiment, an optical splitter 125 is provided at a stage prior to an optical-path switch 123. A WDM coupler 122 outputs light, output from an optical-fiber transmission path 102, to the optical splitter 125. The optical splitter 125 splits the light output from the WDM coupler 122 and outputs resulting first light and second light to the second PD 126 and the optical-path switch 123, respectively.

The optical-path switch 123 is capable of switching between the monitor path 123a through which the light output from the optical splitter 125 is output to a first PD 124 and a working path 123b through which the light output from the optical splitter 125 is output to a receiving-side optical amplifier 103.

As described above, the amplifying apparatus 120 according to the seventh embodiment has the optical-path switch 123 that is capable of switching the output path of the received light between the working path 123b and the monitor path 123a. Thus, in a non-working time, the received light can be monitored with low loss through use of the monitor path 123a. With this arrangement, in a working time, signal light is transmitted to a subsequent stage through the working path 123b and, in a non-working time, the power of pump light can be controlled based on a result of the low-loss monitoring of the received light. Thus, it is possible to reduce the amount of error in the Raman gain.

Similarly, the amplifying apparatus 120 illustrated in FIGS. 2A and 2B, FIGS. 6A and 6B, or FIGS. 10A and 10B and an amplifying apparatus 120 described below and illustrated in FIGS. 12A and 12B may have a configuration in which the optical splitter 125 is provided at a stage prior to the optical-path switch 123.

Eighth Embodiment

Figure 12A:
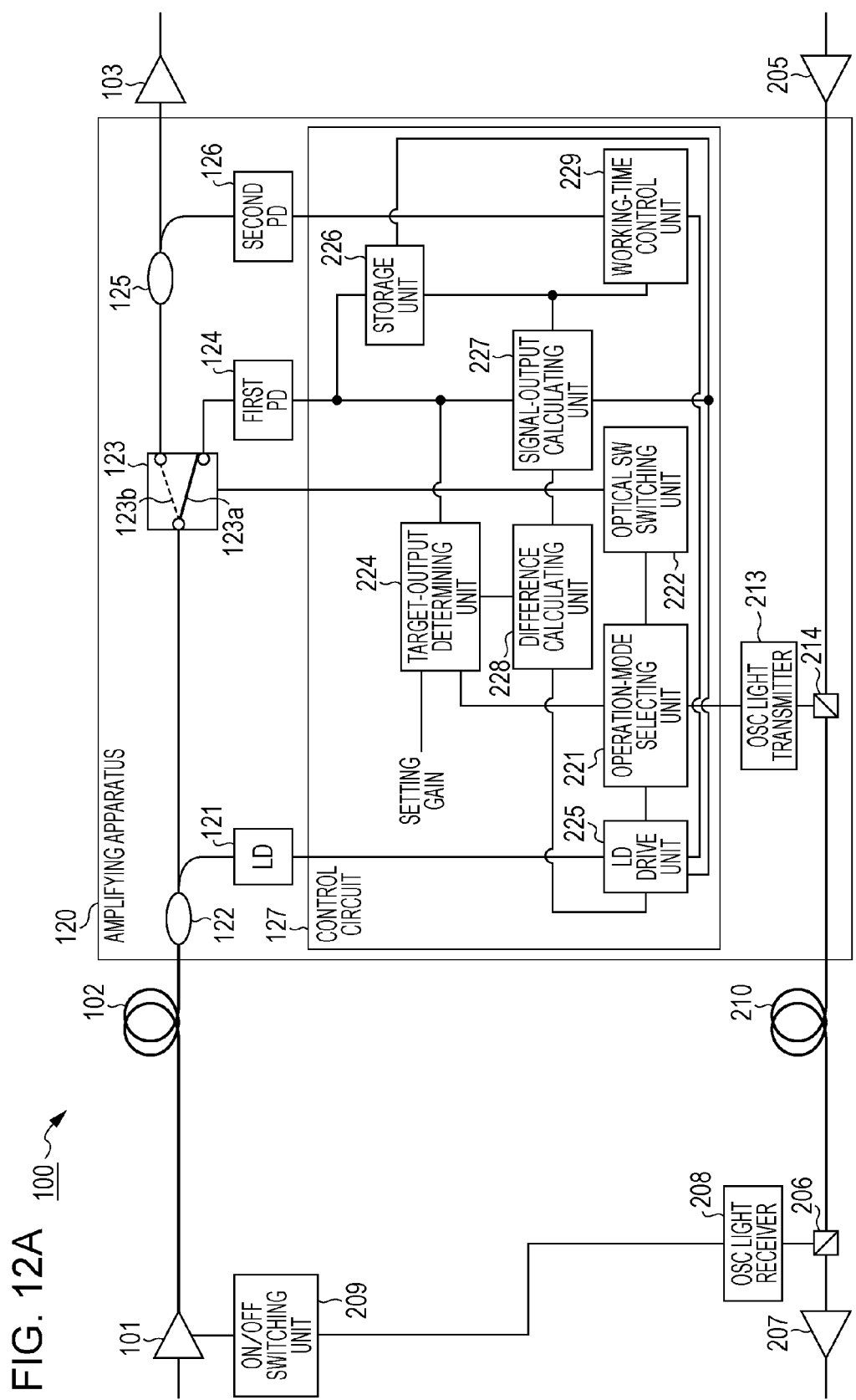
FIG. 12A is a diagram illustrating one example of the configuration of a transmission system according to an eighth embodiment.

FIG. 12A is a diagram illustrating one example of the configuration of a transmission system according to an eighth embodiment. FIG. 12B a diagram illustrating one example of flows of light and electrical signals in the transmission system illustrated in FIG. 12A. In FIGS. 12A and 12B, elements that are substantially the same as those illustrated in FIGS. 2A and 2B are denoted by the same reference numerals, and descriptions thereof are not given hereinafter.

Figure 12B:
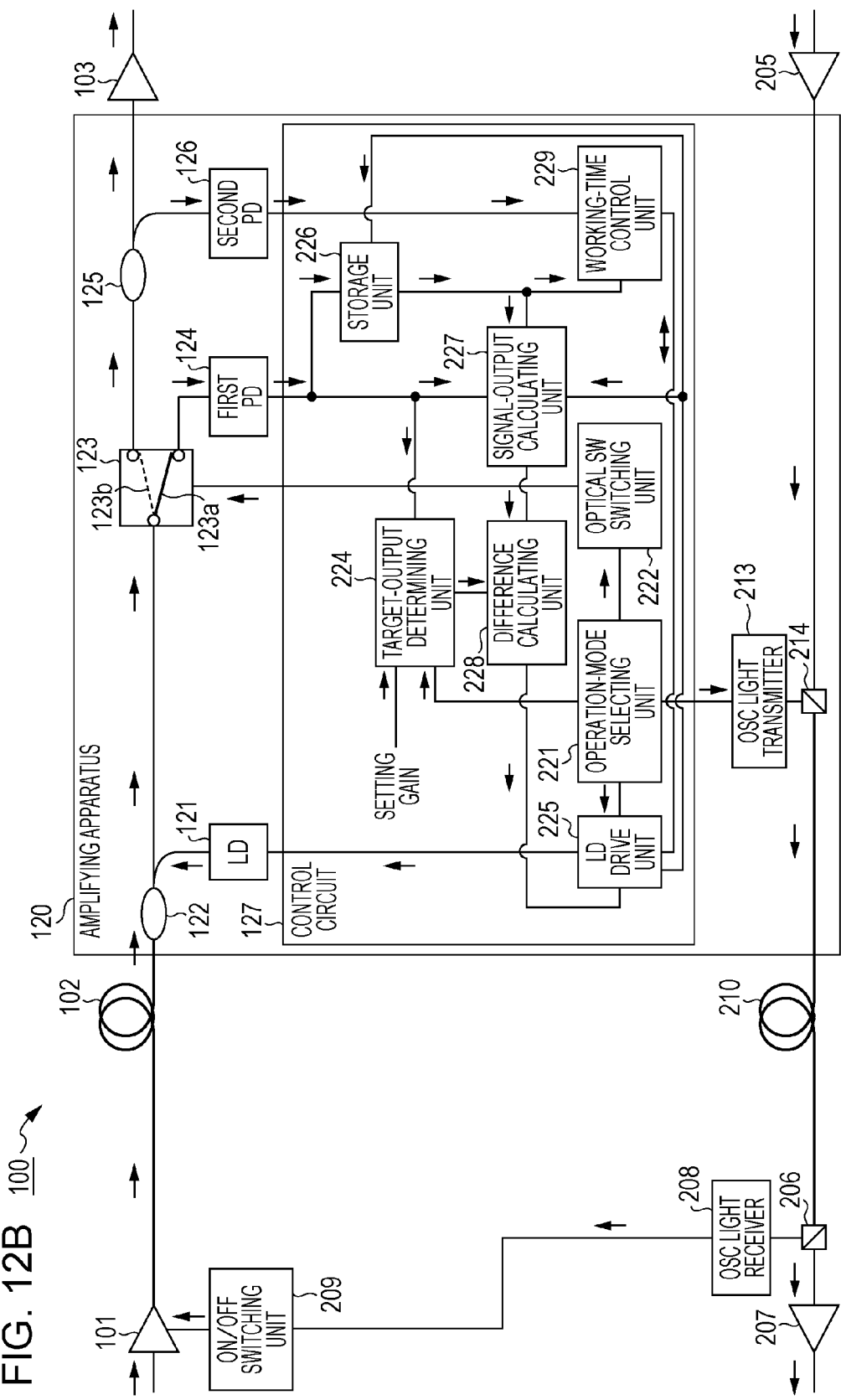
FIG. 12B is a diagram illustrating one example of flows of light and electrical signals in the transmission system illustrated in FIG. 12A.

As illustrated in FIGS. 12A and 12B, a transmission system 100 according to an eighth embodiment has a configuration in which the optical splitter 201, the third PD 202, the OSC light transmitter 203, and the OSC coupler 204 illustrated in FIGS. 2A and 2B are omitted. In the configuration of an amplifying apparatus 120 according to the eighth embodiment, the OSC coupler 211, the OSC light receiver 212, and the span-loss calculating unit 223 illustrated in FIGS. 2A and 2B are also omitted.

FIGS. 13A and 13B are flowcharts illustrating one example of operations of a control circuit in the eighth embodiment during startup. A control circuit 127 in the eighth embodiment executes, for example, the following steps as startup operations when power is turned on. As illustrated in FIG. 13A, the control circuit 127 first enters a target determination mode.

More specifically, in step S1301, the control circuit 127 sets an optical-path switch 123 to a monitor path 123a. Thus, ASE light that was output from a transmitting-side optical amplifier 101 and that suffered loss through an optical-fiber transmission path 102 is received by a first PD 124. In step S1302, the control circuit 127 obtains the receiving-side ASE light power detected by the first PD 124.

In step S1303, the control circuit 127 determines a target output power of the amplifying apparatus 120. For example, the control circuit 127 determines, as a target output power, a result obtained by adding a predetermined setting gain to the receiving-side ASE light power obtained in step S1302. Steps S1304 to S1316 illustrated in FIGS. 13A and 13B are substantially the same as steps S307 to S319 illustrated in FIGS. 3A and 3B. Operations of the control circuit 127 in the eighth embodiment in the working mode are substantially the same as, for example, the operations illustrated in FIG. 4.

Thus, the amplifying apparatus 120 according to the eighth embodiment can provide advantages that are substantially the same as those of the amplifying apparatus 120 in the first or second embodiment without calculating the span loss. Each of the amplifying apparatuses 120 illustrated in FIGS. 6A, 6B, 10A, and 10B may also be configured so that it does not calculate the span loss.

As described above, according to the amplifying apparatus and the control method, there is provided a switch that is capable of switching the output path of received light between a working path and a monitor path. Accordingly, in a working time, the power of pump light can be controlled based on a result of the low-loss monitoring of the received light through use of the monitor path in a non-working time. It is, therefore, possible to reduce the amount of error in the Raman gain.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An amplifying apparatus that raman-amplifies light transmitted through an optical-fiber transmission path, the amplifying apparatus comprising:
    an inputting unit that inputs pump light to the optical-fiber transmission path;
    a path switching unit that is capable of switching between a first state in which the light transmitted through the optical-fiber transmission path is output to a first path and a second state in which the light transmitted through the optical-fiber transmission path is output to a second path;
    a splitting unit that splits the light output to the second path by the path switching unit and outputs resulting first light and second light; and
    a control circuit that stores information based on a result of reception of the light output to the first path by putting the path switching unit into the first state and then controls power of the pump light on a basis of the stored information and a result of reception of the first light output by the splitting unit by putting the path switching unit into the second state.

2. The amplifying apparatus according to claim 1, wherein the inputting unit is provided between the optical-fiber transmission path and the path switching unit to input the pump light in a direction opposite to a direction in which the light is transmitted through the optical-fiber transmission path.

3. The amplifying apparatus according to claim 1, wherein the control circuit stores information based on the result of the light reception by putting the path switching unit into the first state before signal light is transmitted through the optical-fiber transmission path, and controls the power of the pump light by putting the path switching unit into the second state when signal light is transmitted through the optical-fiber transmission path.

4. The amplifying apparatus according to claim 3, wherein the information indicates a relationship between the power of the pump light and power of noise light resulting from inputting of the pump light, and the control circuit stores the information by obtaining power of the light output to the first path while varying the power of the pump light when no light is transmitted from a transmitting side through the optical-fiber transmission path.

5. The amplifying apparatus according to claim 4, wherein the control circuit derives the power of the noise light on a basis of the stored information and the power of the pump light when signal light is transmitted through the optical-fiber transmission path and controls the power of the pump light on a basis of a result obtained by subtracting the power of the noise light from power of the first light output by the splitting unit.

6. The amplifying apparatus according to claim 5, wherein light output from an optical amplifier that outputs noise light in a wavelength band including a wavelength of the signal light is transmitted through the optical-fiber transmission path, and
the control circuit calculates a target power on a basis of the power of the light output to the first path by putting the path switching unit into the first state when the noise light is transmitted through the optical-fiber transmission path before the signal light is transmitted through the optical-fiber transmission path, and controls the power of the pump light so that the result of the subtraction approaches the target power when signal light is transmitted through the optical-fiber transmission path.

7. The amplifying apparatus according to claim 1, wherein the path switching unit serves as a first path switching unit and the amplifying apparatus further comprises a second path switching unit that is capable of switching between a third state in which the light output to the first path by the first path switching unit is output and a fourth state in which the first light output by the splitting unit is output, and wherein the control circuit stores the information based on a result of reception of light output from the second path switching unit by putting the first path switching unit into the first state and putting the second path switching unit into the third state and then controls the power of the pump light on a basis of the stored information and a result of reception of light output from the second path switching unit by putting the first path switching unit into the second state and putting the second path switching unit into the fourth state.

8. The amplifying apparatus according to claim 1, further comprising an optical multiplexer that outputs the light output to the first path by the path switching unit and the first light output by the splitting unit, wherein the control circuit stores the information based on a result of reception of the light output from the optical multiplexer by putting the path switching unit into the first state and then controls the power of the pump light on a basis of the stored information and a result of reception of light output by the optical multiplexer by putting the path switching unit into the second state.

9. An amplifying apparatus that raman-amplifies light transmitted through an optical-fiber transmission path, the amplifying apparatus comprising:
an inputting unit that inputs pump light to the optical-fiber transmission path;
a splitting unit that splits the light transmitted through the optical-fiber transmission path and outputs resulting first light and second light;
a path switching unit that is capable of switching between a first state in which the second light output by the splitting unit is output to a first path and a second state in which the second light is output to a second path;
a control circuit that stores information based on a result of reception of the light output to the first path by putting the path switching unit into the first state and then controls power of the pump light on a basis of the stored information and a result of reception of the light output to the second path by putting the path switching unit into the second state.

10. An amplifying method for an amplifying apparatus that raman-amplifies light transmitted through an optical-fiber transmission path, the amplifying apparatus including an inputting unit that inputs pump light to the optical-fiber transmission path, a path switching unit that is capable of switching between a first state in which the light transmitted through the optical-fiber transmission path is output to a first path and a second state in which the light transmitted through the optical-fiber transmission path is output to a second path, and a splitting unit, the amplifying method comprising:
storing information based on a result of reception of the light output to the first path by putting the path switching unit into the first state; and
controlling power of the pump light on a basis of the stored information and a result of reception of the first light output by the splitting unit by putting the path switching unit into the second state.

11. An amplifying method for an amplifying apparatus that raman-amplifies light transmitted through an optical-fiber transmission path, according to claim 10, wherein the splitting unit that splits the light output to the second path by the path switching unit and outputs resulting first light and second light.

12. An amplifying method for an amplifying apparatus that raman-amplifies light transmitted through an optical-fiber transmission path, according to claim 10, wherein the splitting unit that splits the light transmitted through the optical-fiber transmission path and outputs resulting first light and second light.

* * * * *